(12) United States Patent
Morohoshi

(10) Patent No.: US 9,063,399 B2
(45) Date of Patent: Jun. 23, 2015

(54) ELECTRONIC DEVICE HAVING A VENT UNIT

(75) Inventor: Hiroshi Morohoshi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 96 days.

(21) Appl. No.: 13/595,087

(22) Filed: Aug. 27, 2012

(65) Prior Publication Data

US 2013/0050658 A1 Feb. 28, 2013

(30) Foreign Application Priority Data

Aug. 30, 2011 (JP) ................................ 2011-186706

(51) Int. Cl.
*G03B 21/14* (2006.01)
*G03B 21/16* (2006.01)

(52) U.S. Cl.
CPC .............. *G03B 21/145* (2013.01); *G03B 21/16* (2013.01)

(58) Field of Classification Search
CPC ... B01D 2265/06; G03B 21/145; G03B 21/14
USPC .......... 353/55–57; 348/739–771; 55/490–519
See application file for complete search history.

(56) References Cited

U.S. PATENT DOCUMENTS

| | | | | |
|---|---|---|---|---|
| 5,131,709 | A * | 7/1992 | Spica | 296/39.2 |
| 8,087,788 | B2 | 1/2012 | Chen | |
| 2005/0160707 | A1* | 7/2005 | Dries | 55/418 |
| 2005/0264766 | A1* | 12/2005 | Morimoto et al. | 353/61 |
| 2008/0123062 | A1 | 5/2008 | Morikuni | |
| 2008/0212038 | A1 | 9/2008 | Hirata et al. | |
| 2009/0009728 | A1* | 1/2009 | Liu et al. | 353/57 |
| 2010/0321646 | A1 | 12/2010 | Nakano et al. | |
| 2011/0199584 | A1* | 8/2011 | Yamamoto et al. | 353/74 |

FOREIGN PATENT DOCUMENTS

| | | |
|---|---|---|
| CN | 101055933 A | 10/2007 |
| CN | 101655656 A | 2/2010 |
| JP | 2002309585 A * | 10/2002 |
| JP | 2003-287816 | 10/2003 |
| JP | 2004-029356 | 1/2004 |
| JP | 2008-096792 | 4/2008 |
| JP | 2008-158495 | 7/2008 |
| JP | 2009-288803 | 12/2009 |
| JP | 2010075082 A * | 4/2010 |
| JP | 2010250081 A | 11/2010 |
| JP | 2011-002610 | 1/2011 |
| JP | 2011-002613 | 1/2011 |
| WO | WO-2010108597 A1 | 9/2010 |

OTHER PUBLICATIONS

Chinese Office Action dated Jul. 3, 2014 for corresponding Chinese Application No. 201210448421.1 (full translation provided).

* cited by examiner

*Primary Examiner* — Sultan Chowdhury
*Assistant Examiner* — Danell L Owens
(74) *Attorney, Agent, or Firm* — Harness, Dickey & Pierce P.L.C.

(57) ABSTRACT

An electronic device includes a housing; and a vent unit provided to the housing, the vent unit having a two-dimensional lattice unit and a column part, the two-dimensional lattice unit including one-dimensional lattice parts intersecting each other, the column part being provided at an intersection of the one-dimensional lattice parts and protruding to at least one of the inside and the outside of the two-dimensional lattice unit.

9 Claims, 18 Drawing Sheets

FIG.11
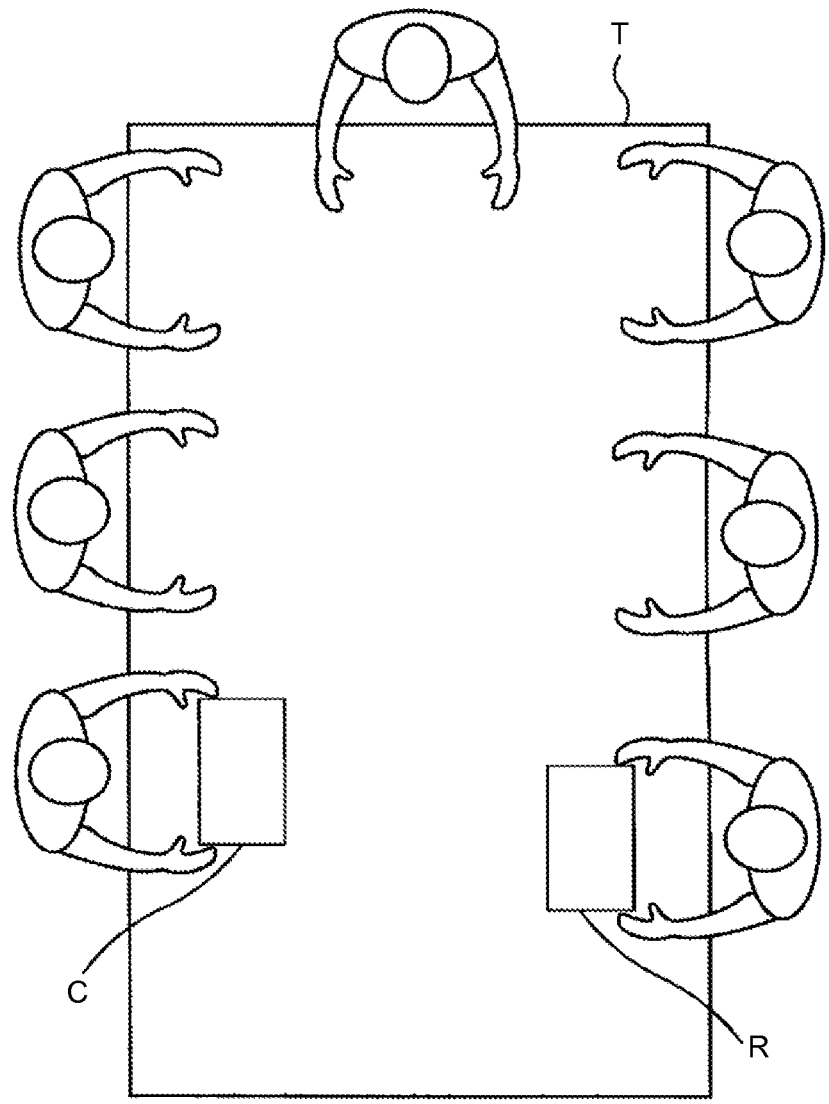
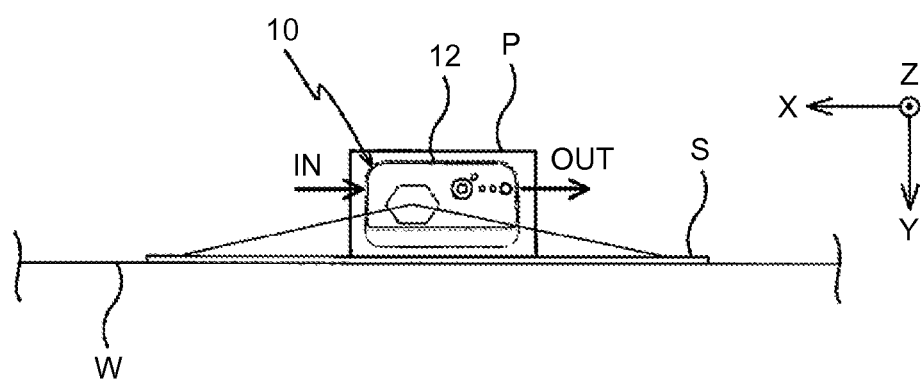

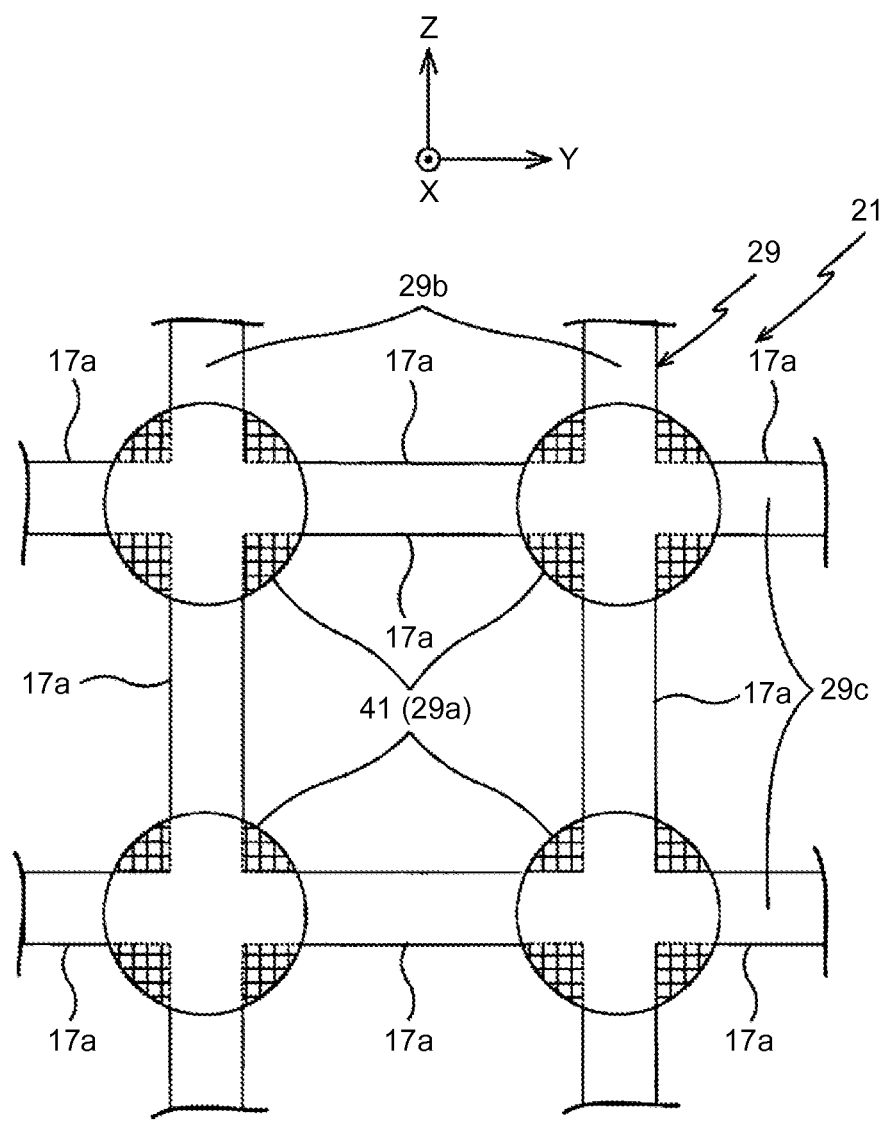

← INSIDE OF HOUSING     OUTSIDE OF HOUSING →

← INSIDE OF HOUSING     OUTSIDE OF HOUSING →

ELECTRONIC DEVICE HAVING A VENT UNIT

CROSS-REFERENCE TO RELATED APPLICATION

The present application claims priority to and incorporates by reference the entire contents of Japanese Patent Application No. 2011-186706 filed in Japan on Aug. 30, 2011.

BACKGROUND OF THE INVENTION

1. Field of the Invention
The present invention relates to an electronic device.
2. Description of the Related Art
Conventionally, electronic devices (for example, a projector) including a housing provided with a vent hole has been known (see, for example, Japanese Patent Application Laid-open No. 2003-287816).

In the electronic device, within an opening of a short duct disposed at the position adjacent the vent hole within the housing, a plurality of louvers including plate-like members are provided inclined with respect to the vent direction of the vent hole, so that the components (for example, a fan) are not likely to be seen through the vent hole and the opening of the duct. Accordingly, the blind effect can be obtained.

In the electronic device disclosed in Japanese Patent Application Laid-open No. 2003-287816, however, since the airflow blows against the plurality of inclined louvers, there has been an increased pressure loss of the airflow.

Therefore, there is a need for an electronic device capable of reducing the pressure loss of the airflow while obtaining the blind effect.

SUMMARY OF THE INVENTION

It is an object of the present invention to at least partially solve the problems in the conventional technology.

According to an embodiment, there is provided an electronic device that includes a housing; and a vent unit provided to the housing, the vent unit having a two-dimensional lattice unit and a column part, the two-dimensional lattice unit including one-dimensional lattice parts intersecting each other, the column part being provided at an intersection of the one-dimensional lattice parts and protruding to at least one of the inside and the outside of the two-dimensional lattice unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram for illustrating an example of a method of using the projector;
FIG. 14 is a side view extracting a part of the lattice unit.

DETAILED DESCRIPTION OF THE PREFERRED EMBODIMENTS

Figure 1:
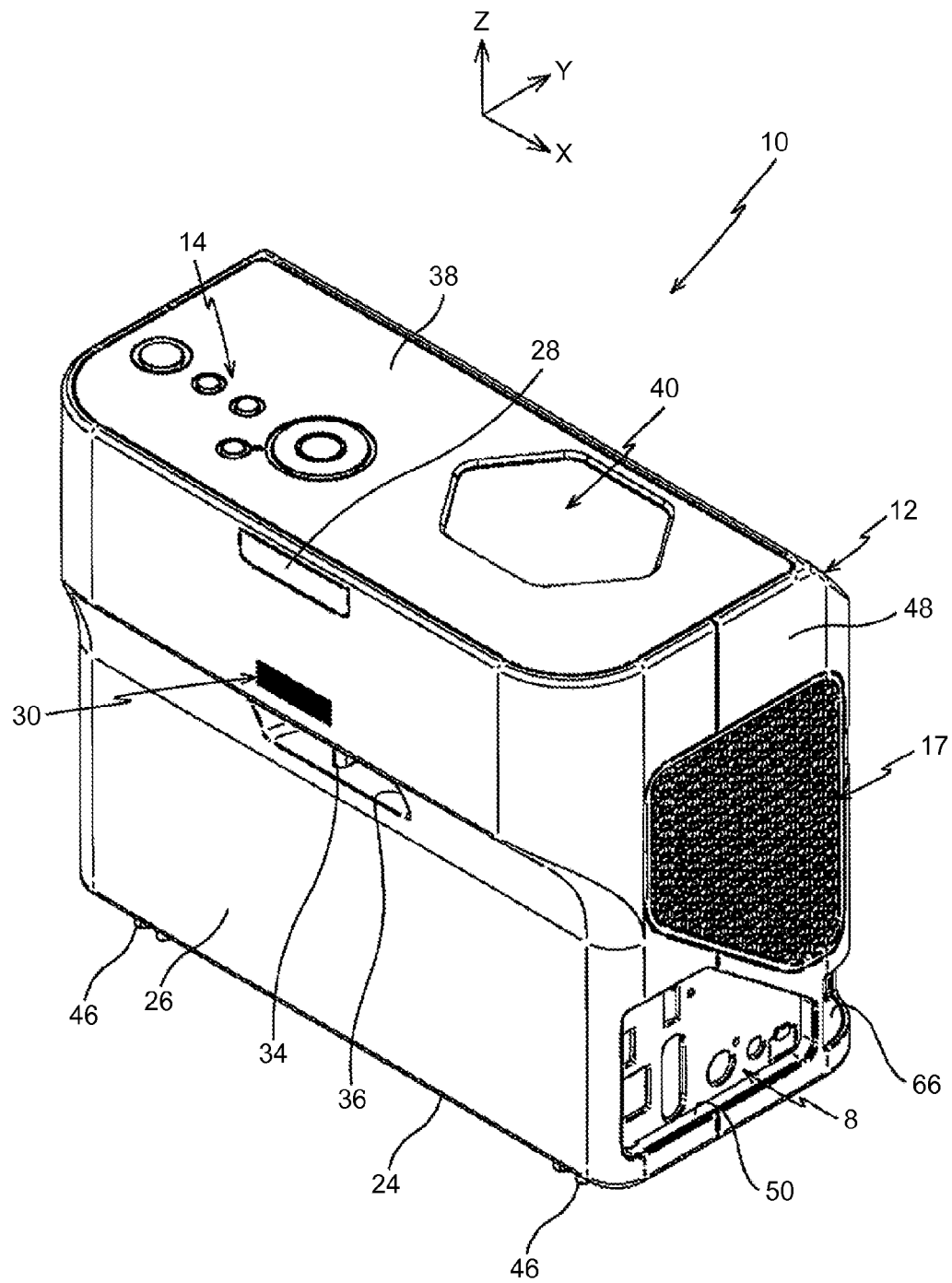
FIG. 1 is a perspective view of a projector of one embodiment of the present invention.

Embodiments of the present invention will be described below based on FIG. 1 to FIG. 14. In FIG. 1, a projector 10 as an electronic device according to an embodiment is illustrated in a perspective view. Further, in FIG. 2, the general arrangement of the projector 10 is illustrated in a block diagram.

The projector 10 is placed on the upper surface of a pedestal P (see FIG. 12) set up on the floor F parallel to the horizontal plane (or on the floor) and used, for example.

The projector 10 includes, as an example, a housing 12; a projection optical system 16 that is accommodated in the housing 12 and projects a beam on a screen S (see FIG. 11 and FIG. 12) based on input information from an external device such as a DVD video recorder R, a personal computer C, or USB memory M; a light receiving sensor unit 28; an operating unit 14; a cooling unit 22; a speaker 18; a connector unit 8 to which the external devices described above are connected; and a control unit 20 to which these units are connected. In addition, the projector 10 includes an adjustment mechanism (not illustrated) and the like such as for changing the size of the image projected on the screen S by driving a part of the projection optical system 16, though illustration is omitted.

Here, for convenience sake of the description, prior to the description of individual components of the projector 10 which can be seen from outside, the description will be provided for main parts, that is, the projection optical system 16 and the cooling unit 22 among other individual components accommodated in the housing 12.

Figure 3:
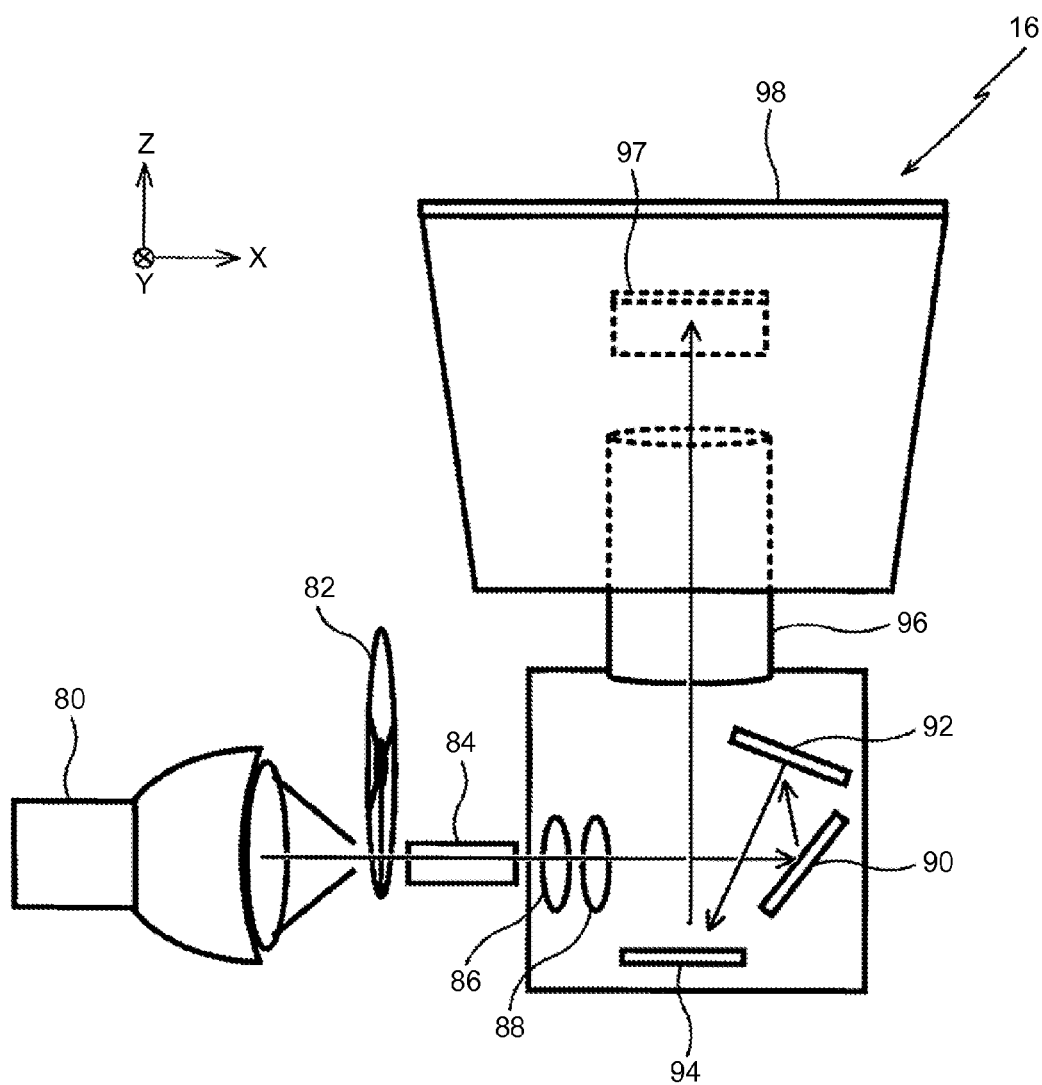
FIG. 3 is a diagram schematically illustrating an arrangement of the projection optical system of the projector.

As illustrated in FIG. 3, the projection optical system 16 includes, as an example, a light source 80 that emits light; a color wheel 82 that functions as a light splitting unit; a light tunnel 84 that functions as a light uniformizing unit; two condenser lenses 86 and 88 that function as light refraction units (light condensing units); two mirrors 90 and 92 that function as light reflection units; a digital micromirror device (DMD) 94 that functions as a light modulation unit; a projection lens 96 that functions as a light angle widening and image forming unit; a mirror 97 that functions as a light reflection unit; and a free-form surface mirror 98 that functions as a light angle widening and reflection unit, which are disposed in the order along a light path from the light source 80.

The projection lens 96 includes a plurality of lens elements (not illustrated) disposed at a predetermined interval along a light axis direction, where the Z axis is the light axis direction. The DMD 94 is controlled by the control unit 20 according to the image information outputted from, for example, a personal computer or a DVD recorder. It is noted that, in FIG. 3, the light path from the light source 80 to the mirror 97 is indicated by an arrow.

In the projection optical system 16, the light emitted from the light source 80 enters the color wheel 82. The light incident to the color wheel 82 is split in a time sequence manner into individual color lights of the three primary colors and sequentially extracted from the color wheel 82. The individual color lights extracted from the color wheel 82 enter the light tunnel 84 and, with their intensities being made even, sequentially enter the condenser lenses 86 and 88. The individual color lights incident to the condenser lenses 86 and 88 are, after the image forming surface is adjusted, sequentially reflected at the mirrors 90 and 92 and enter the DMD 94. The individual color lights incident to the DMD 94 are reflected while being modulated by the DMD 94 according to the above-described image information and sequentially enter the projection lens 96. The individual color lights incident to the projection lens 96 are, after the angle is widened, reflected at the mirror 97 and sequentially enter the free-form surface mirror 98. The individual color lights incident to the free-form surface mirror 98 are reflected at the free-form surface mirror 98 while being widened in the angle, and are sequentially projected in the obliquely upward direction in +Z, +Y side of the housing 12 (the obliquely upward direction of the outer wall surface of a rear wall 42 of the housing 12 described later) through a light projection opening described later (see FIG. 12).

Figure 12:
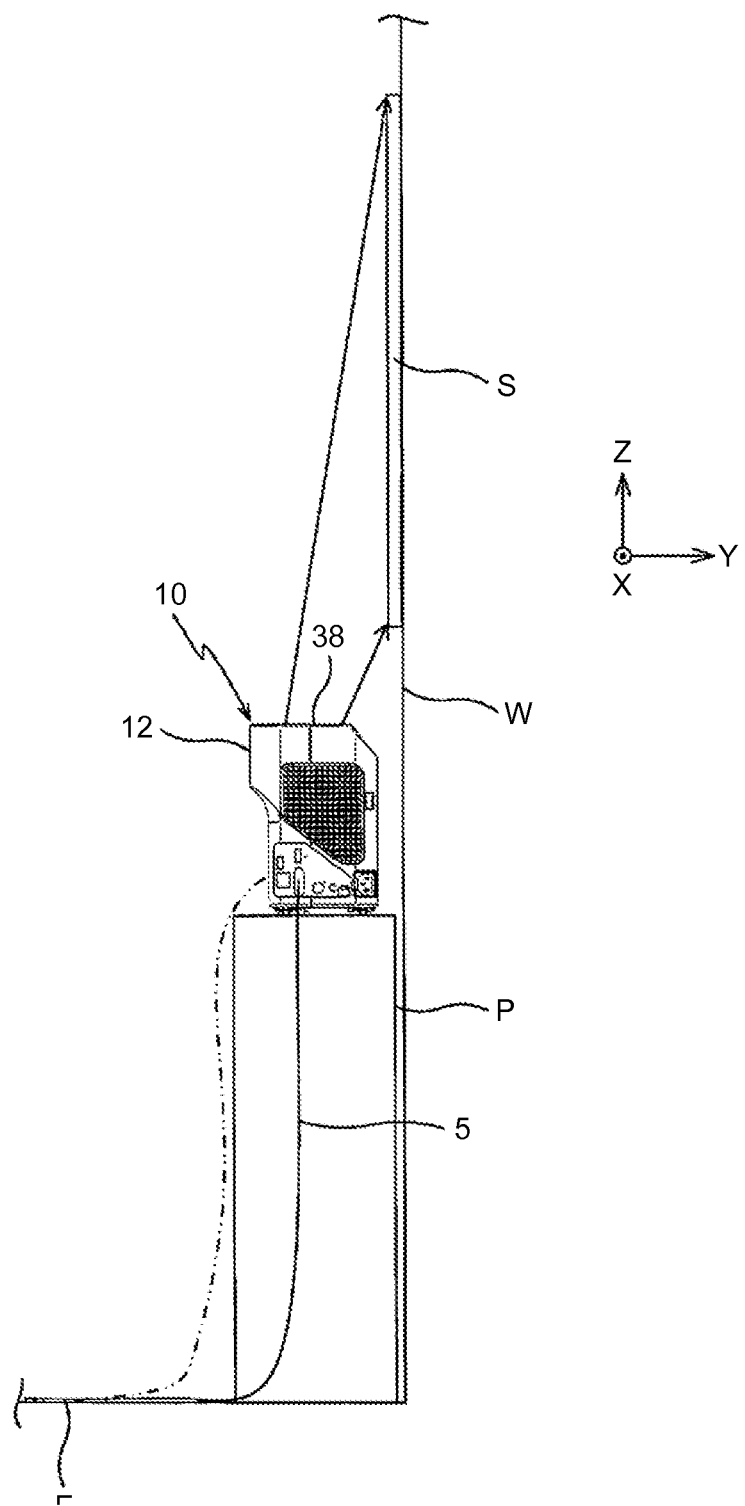
FIG. 12 is a diagram for illustrating the example of a method of using the projector.

The projection optical system 16 is configured such that the focal point position of the projected light comes closer, that is, configured with a short focal point, and is able to display (project) a large, color (or monochrome) image in a short projection distance on the screen S arranged close to the obliquely upward direction in +Z, +Y side of the housing 12, for example (see FIG. 12). Here, "the projection optical system is configured with a short focal point" means that the projection optical system is the optical system that includes a mirror having a refractive power (for example, the above-described free-form surface mirror 98). The refractive power of this mirror may be positive or negative. The projection optical system including the mirror having the refractive power allows a large projection image of approximately 80 inches to be displayed even if the distance from the light projection opening to the screen is within, for example, 50 centimeters. It is noted that the configuration of the projection optical system is not limited to the above and can be modified as needed.

The cooling unit 22 discharges the heat, which is generated at the heating elements such as the light source 80 (see FIG. 2 and FIG. 3) and a CPU 11 (see FIG. 2) mounted on the not-illustrated substrate of the control unit 20, out of the housing 12 to cool these heating elements.

The cooling unit 22 includes, for example, a metal heat sink (not illustrated) as a heat radiating member connected to the light source 80 and the CPU 11, respectively, a duct (not illustrated) as an airflow guiding member, a fan 15 (see FIG. 2) as an airflow generating device, and an intake port and an exhaust port described later as the vent holes.

The above-described duct has a first part whose one end (one opening end) is disposed near the intake port described later provided to the housing 12 and the other end (the other opening end) is disposed near (the above-described heat sink connected respectively to) the light source 80 and the CPU 11, and a second part whose one end (one opening end) is disposed near the exhaust port described later provided to the housing 12 and the other end (the other opening end) is disposed near the light source 80 and the CPU 11. It is noted that a dust proof filter (not illustrated) is disposed between the intake port and the one end of the above-described first part and between the exhaust port and the other end of the above-described second part.

The fan 15 is disposed at the position adjacent to the exhaust port in the second part of the above-described duct, for example. As the fan 15, a large fan is employed as an example. The fan 15 is adapted to be driven when the power supply for the electric system of the projector 10 is turned on. It is noted that the fan 15 is not limited to be disposed at the position described above and it may be disposed at other position (for example, the position adjacent to the intake port) as long as it is able to effectively generate an airflow in the above-described duct.

Upon the fan 15 being driven, the air (outside air) flows into the above-described duct (within the housing 12) through the intake port described later, and the flown air goes forward guided by the duct and is exhausted out of the duct (outside the housing 12) through the exhaust port described later with taking in the heat radiated from the heating parts (respective heat sinks) such as the light source 80 and the CPU 11. Thereby, the heat radiated from the heating elements (respective heat sinks) is exhausted out of the housing 12, so that the heating elements such as the light source 80 and the CPU 11 are effectively cooled.

As illustrated in FIG. 1, the housing 12 has substantially the rectangular parallelepiped shape as a whole. Below, the descriptions will be provided under the definition that the width direction of the housing 12 of the projector 10 (one axis direction within the horizontal plane that is parallel to the screen S when set on the upper surface (the surface parallel to the horizontal plane) of the pedestal P) is the X axis direction, the depth direction of the projector 10 (the direction orthogonal to the X axis direction within the horizontal plane) is the Y axis direction, and the height direction of the projector 10 (the perpendicular direction orthogonal both to the X axis and the Y axis) is the Z axis direction.

In FIG. 4 to FIG. 8, illustrated are a view seen from the −Y direction (the front view) of the projector 10, a view seen from the +Z direction (the plane view (the top view)), a view seen from the +X direction (right side view), a view seen from the −X direction (the left side view), and a view seen from the −Z direction (the bottom view), respectively. Below, based on these drawings, individual components of the projector 10 seen from outside will be described.

Figure 6:
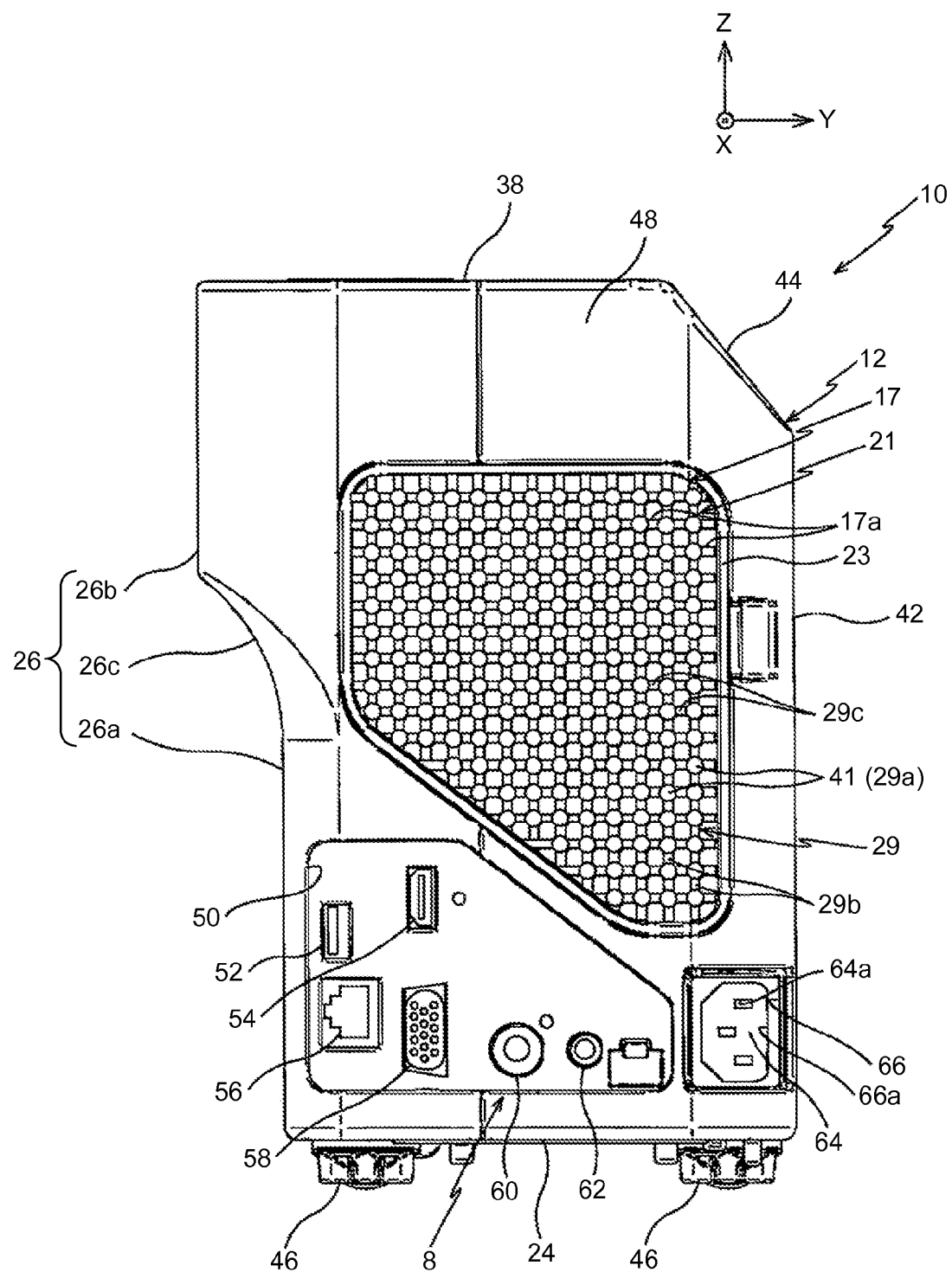
FIG. 6 is a right side view of the projector.
Figure 7:
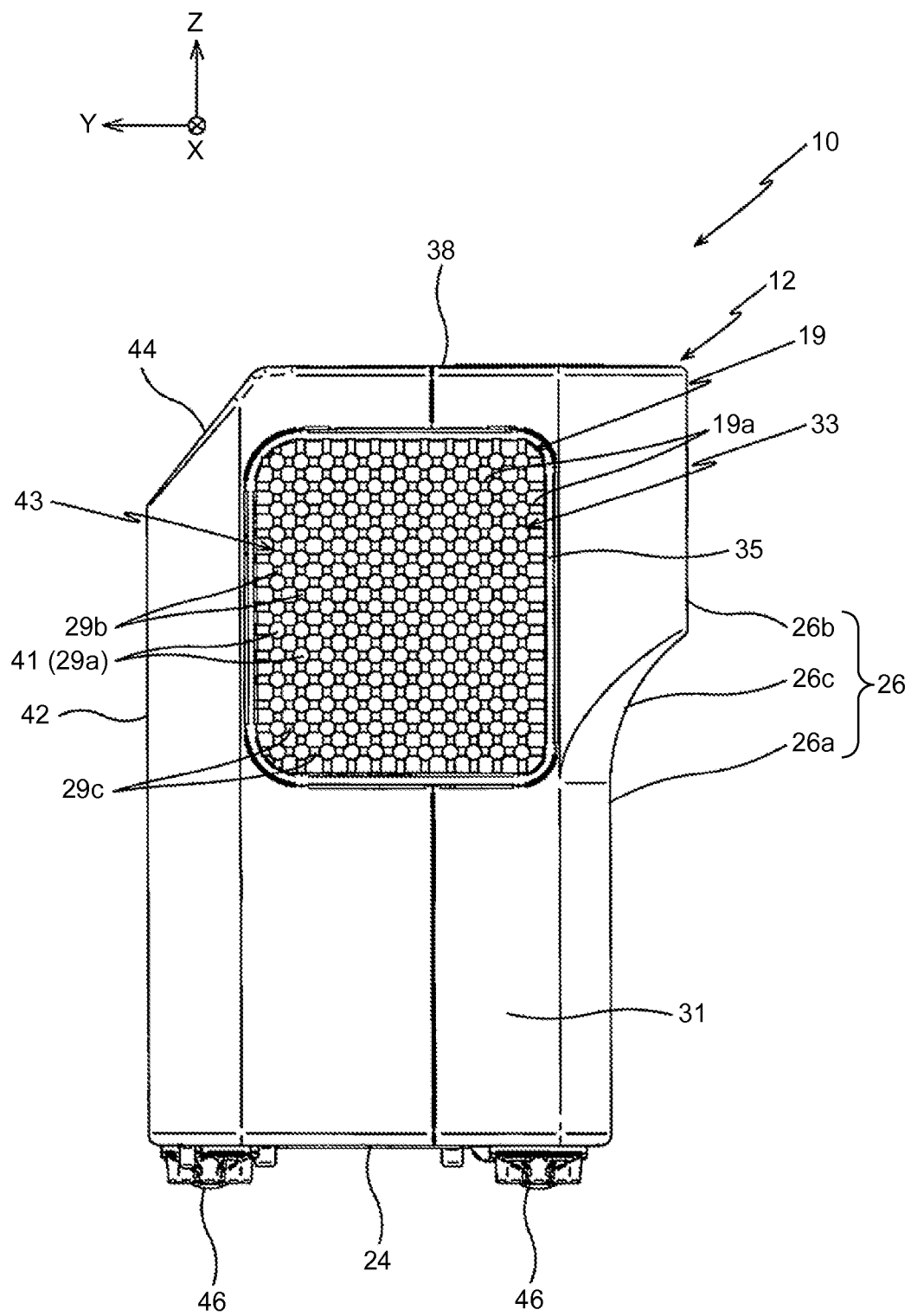
FIG. 7 is a left side view of the projector.

The housing 12 includes a box-shaped hollow member (member of substantially the rectangular parallelepiped shape). For the material of the housing 12, a relatively light weight and robust material is used, for example, a rigid resin such as a plastic. The housing 12 is, for example, white except an upper wall 38. In the housing 12, as illustrated in FIG. 6 and FIG. 7, the length in the Y axis direction of a bottom wall 24 is shorter than the size of the height direction of a front wall (the wall in −Y side) 26 or the rear wall (the wall in +Y side) 42. In other words, the area of the wall surface of the side wall 26 in −Y side or the side wall 42 in +Y side of the housing 12 is larger than the area of the bottom wall 24, and therefore the projector 10 is so called vertical stand type apparatus.

In details, in the housing 12, the depth of the bottom wall 24 (the length in the Y axis direction) is set to, for example, 5 to 8 cm, the height (the size in the Z axis direction) is, for example, twice the length (10 to 16 cm) in the Y axis direction of the bottom wall 24, and the width (the length in the X direction) is, for example, three times the length (15 to 24 cm) in the Y axis direction of the bottom wall 24. That is, the projector 10 is of compact vertical stand type.

As illustrated in FIG. 6 and FIG. 7, the front wall 26 of the housing 12 has three parts of a lower part 26a parallel to the X-Z plane, an upper part 26b located in +Z, −Y side of the lower part 26a and parallel to the X-Z plane, and a middle part 26c including a gentle curved surface connecting the lower part 26a and the upper part 26b. Since the middle part 26c forms a step, hereafter, it is referred to also as step 26c as needed. For example, when carrying the projector 10 by grasping the housing 12 with both hands from the +X side and the −X side, the user can firmly hold the housing 12 by hooking both hands in the step 26c.

Figure 4:
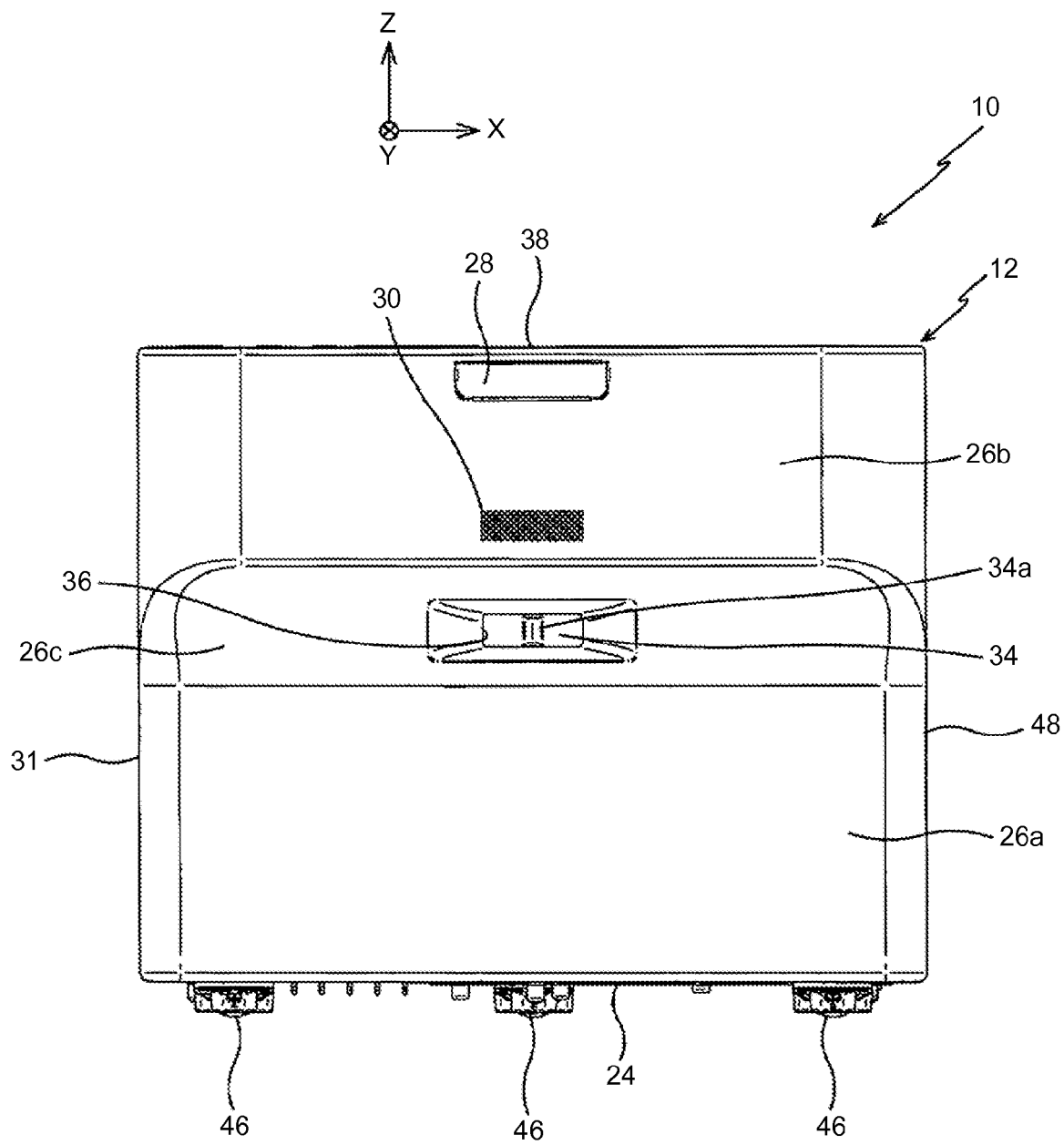
FIG. 4 is a front view of the projector.

As illustrated in FIG. 4, the light receiving sensor unit 28 is provided at the center of the upper end of the upper part 26b of the front wall 26 of the housing 12. At the center of the light receiving sensor unit 28, a light receiving sensor for receiving the optical signal from the not-illustrated remote controller is disposed and, near the light receiving sensor, a not-illustrated light emitting diode (LED) is provided that changes in at least one of the color of emitting light and the emitting timing according to the state (for example, normal state, abnormal state) of the projector 10. It is noted that the abnormal state of the projector 10 refers to the occurrence of the operational malfunction of the fan 15, the CPU 11, and the light source 80 described later, for example. Upon receiving the optical signal from the above-described remote controller, the light receiving sensor converts the optical signal into an electric signal to output it to the control unit 20, and the control unit 20 executes respective control operations according to the instruction corresponding to the electric signal. Since the light receiving sensor is provided at the center of the light receiving sensor unit 28, it is ensured to be able to receive the light from the remote controller. Further, the state of the projector 10 can be informed to the user by the emission timing and/or the color of the LED. The remote controller has a function of providing the same instruction as the operating unit 14 to the control unit 20, for example. The functions provided by the operating unit 14 will be described later.

Figure 2:
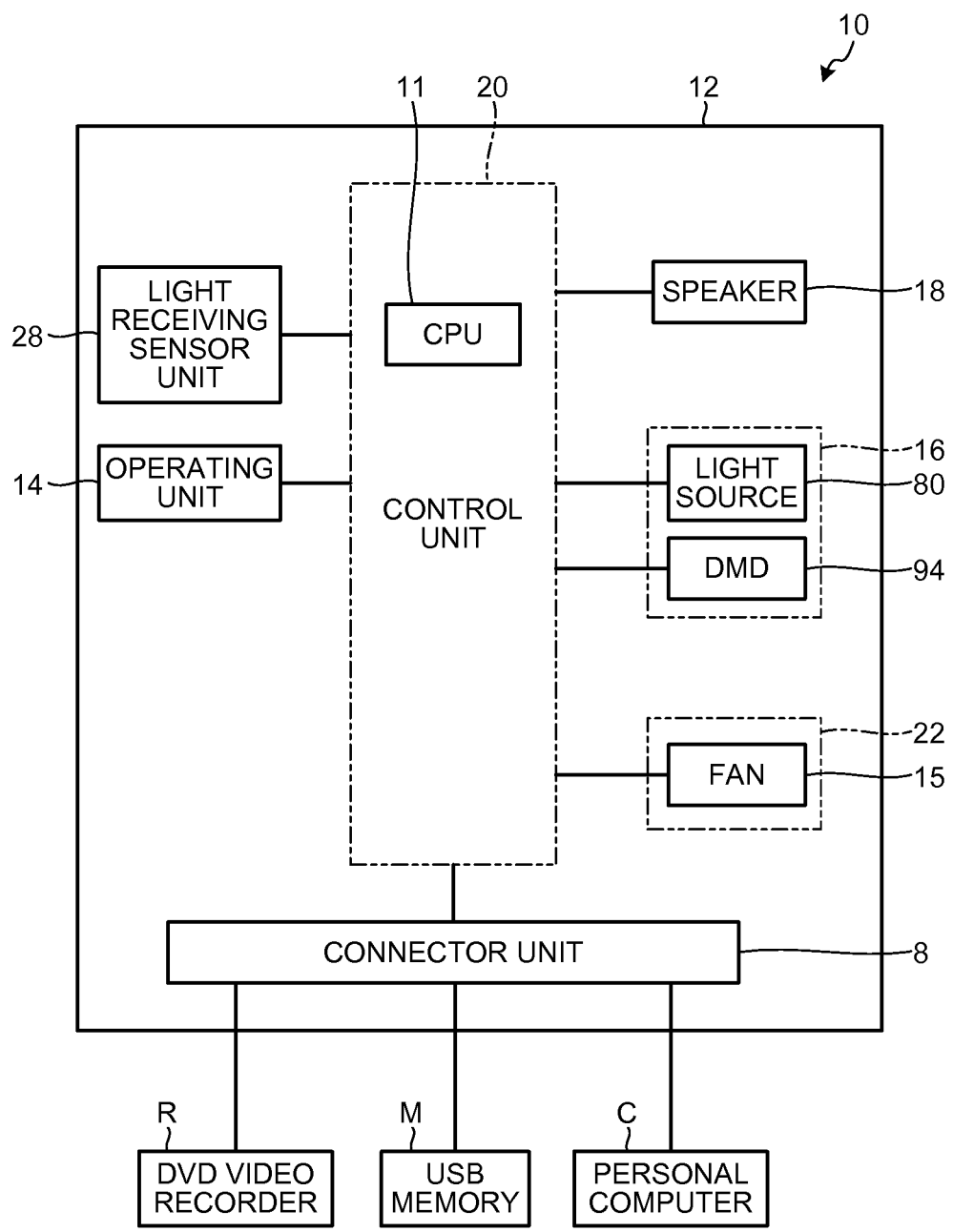
FIG. 2 is a block diagram schematically illustrating an internal arrangement of the projector together with external devices.

The center of the lower end of the upper part 26b (lower position of the light receiving sensor unit 28) of the front wall 26 of the housing 12 is provided with a sound discharging opening 30 including multiple through holes for discharging the sound outputted from the speaker 18 (see FIG. 2). Although the multiple through holes of the sound discharging opening 30 are two-dimensionally arranged at a predetermined interval within the rectangular shaped region in the front view, they are not limited to it and may be two-dimensionally arranged within a region of, for example, a polygon (except the rectangular), a circle, an ellipse, and so on. For the sound discharging opening 30, the size, the number, and the density of the through holes are set to appropriate values according to the characteristics and the like of the speaker 18. The speaker 18 will be described later.

The center in the X axis direction of the middle part (step) 26c of the front wall 26 of the housing 12 is formed with a window 36 for the operation of a knob 34a of a focus adjustment lever 34 for adjusting the focal point position (focus) of the projection lens 96 (see FIG. 3). The knob 34a of the focus adjustment lever 34 and the window 36 are provided in the step 26c of the front wall 26 of the housing 12 so that they do not stand out so much.

The window 36 is formed in a rectangular shape whose longitudinal direction is the X axis direction when viewed from the front, and formed tapered such that the rear of the sheet (+Y) is narrower than the front of the sheet (−Y) in FIG. 4.

The focus adjustment lever 34 is arranged so as to be able to slide in the X direction (or able to revolve with respect to the Z axis), and is mechanically connected to the projection lens 96 (see FIG. 3) via a driving force transferring mechanism (not illustrated) including a gear and the like, for example. The above-described driving force transferring mechanism causes a part of the lens elements of the projection lens 96 to move along the light axis direction in response to the slide of the focus adjustment lever 34. Thereby, the focal point position of the projection lens 96 is adjusted. Specifically, in response that the focus adjustment lever 34 is driven to one side in the X axis direction (or one direction around the Z axis), the position (focal point position) where the light projected via the projection lens 96 forms an image will be farther. Contrarily, in response that the focus adjustment lever 34 is driven to the other side in the X axis direction (or the other direction around the Z axis), the above-described focal point position will be nearer.

The knob 34a of the focus adjustment lever 34 is inserted from the inside of the housing 12 into the window 36, and its tip has been set to the size so as not to jut out from the surface of the middle part (step) 26c of the front wall 26 of the housing 12 in which the window 36 is formed. As such, since the focus adjustment lever 34 does not jut out from the housing 12, careless operation thereto can be prevented and it will not be an obstacle in carrying the projector 10.

As illustrated in FIG. 4, FIG. 6, and FIG. 7, the upper wall 38 of the housing 12 includes a plate-like part parallel to the X-Y plane continuing to the upper part 26b of the front wall 26 of the housing 12. The upper wall 38 is, for example, black and therefore a contrast to other white parts of the housing 12 is provided. This gives the projector 10 an appearance exhibiting sharp contrast as a whole.

Figure 5:
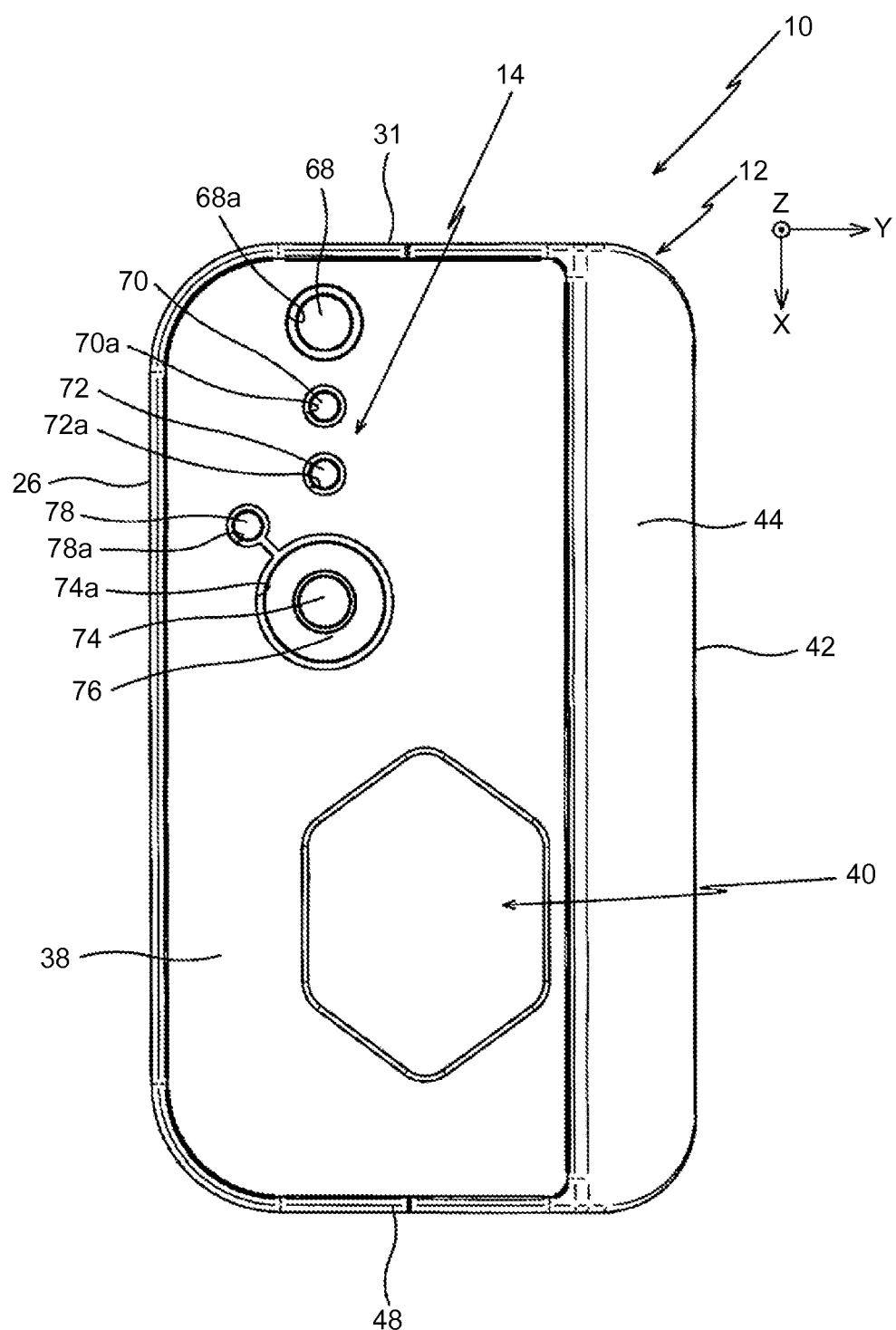
FIG. 5 is a top view of the projector.

As illustrated in FIG. 5, the upper wall 38 of the housing 12 is provided with a light projection opening 40 and the operating unit 14. The light projection opening 40 includes an opening of a polygonal shape (for example, hexagon) in the plane view formed at a portion in +X, +Y side of the upper wall 38. The light projection opening 40 is closed by a transparent or semitransparent cover member. As described later, the light from the projection optical system 16 is projected outside the housing 12 through the cover member closing the light projection opening 40. Below, for the sake of convenience, the cover member is called also as the light projection opening 40.

As illustrated in FIG. 5, the operating unit 14 includes a plurality of (for example, six) operating members provided in the region in −X side of the light projection opening 40 on the upper wall 38 of the housing 12. For the plurality of operating members, press buttons are employed as an example.

In details, a power button 68, an input button 70 (input switching button), a mute button 72, and an enter button 74 (select button) are aligned in a line in this order from −X side to +X side on the middle part in the Y axis direction at the −X side in the upper wall 38 of the housing 12.

The power button 68 is an operating member for switching on/off of the power supply to the electric system of the projector 10. The power button 68 has a part to be pressed (upper part) including a circular part in the plane view, and the part to be pressed is inserted coaxially and vertically movably in a circular opening 68a that is larger than the part to be pressed and that is formed near the end in −X side of the upper wall 38 of the housing 12. The power button 68 is applied with a force upward by a spring and the like. In response that the power button 68 is pressed down against the upward applied force, the on/off of the power supply to the above-described electric system is switched. The power button 68 may be configured such that, when once pressed down, it keeps its position and, only in the pressed-down state, the power supply is in the on state, or such that the on/off is switched every time it is pressed down.

Under the power button 68, a blue LED is provided, for example, so as to emit light when the power supply is on, so that the position of the power button 68 can be known even when the circumference of the projector 10 is dark.

The input button 70 is an operating member for switching the input of the external device or the external memory connected to the projector 10 (hereafter, both referred to also as the connected device, respectively). The input button 70 has a part to be pressed (upper part) including a circular part in the plane view, and the part to be pressed is inserted coaxially and vertically movably in a circular opening 70a that is larger than the part to be pressed and is formed adjacent in +X side of the circular opening 68a in the upper wall 38 of the housing 12. The input button 70 is applied with a force upward by a spring and the like. In response that the input button 70 is pressed down against the upward applied force, the input to the projector 10 is switched to other connected device outputting a video signal.

The mute button 72 is an operating member for turning off (muting) the light projected from the projection optical system 16 and the sound outputted from the speaker 18. The mute button 72 has a part to be pressed (upper part) including a circular part in the plane view, and the part to be pressed is inserted coaxially and vertically movably in a circular opening 72a that is larger than the part to be pressed and that is formed adjacent in +X side of the circular opening 70a in the upper wall 38 of the housing 12. The mute button 72 is applied with a force upward by a spring and the like. When the light is projected from the projection optical system 16 and the sound is outputted from the speaker 18, in response that the mute button 72 is pressed down against the upward applied force, the projection of the light from the projection optical system 16 is stopped and the output of the sound from the speaker 18 is also stopped. In response that the mute button 72 is again pressed down, the mute is released and therefore the projection of the light from the projection optical system 16 is resumed and the output of the sound from the speaker 18 is also resumed.

The enter button 74 is an operating member for finalizing an item (an item where the selecting display is positioned) selected in response to a cursor 76 described later being operated in the menu window on the projected surface of the screen S (see FIG. 11, FIG. 12) displayed in response to a menu button 78 described later being operated. The enter button 74 has a part to be pressed (upper part) including a circular part in the plane view, and the part to be pressed is inserted coaxially and vertically movably in the center of a larger circular opening 74a formed adjacent in the +X side (near the center in the X axis direction of the upper wall 38) of the circular opening 72a in the upper wall 38 of the housing 12. The enter button 74 is applied with a force upward by a spring and the like. With the selected display positioning at a particular item in the above menu window, in response that the enter button 74 is pressed down against the upward applied force, the detailed content of the particular item is displayed in the menu window.

Near the peripheral of the enter button 74 in the upper wall 38 of the housing 12, the cursor 76 as an operating member is disposed within the circular opening 74a surrounding the peripheral of the enter button 74. The cursor 76 is an operating member for selecting an item in the menu window projected on the screen S. The cursor 76 has a part to be pressed (upper part) including an annular part in the plane view that is smaller than the circular opening 74a, and the part to be pressed is inserted so as to be able to be inclined with respect to the X axis and the Y axis. The cursor 76 is applied with a force upward by a spring and the like. When either edge of +X side, −X side, +Y side, or −Y side of the cursor 76 is pressed down against the upward applied force, the selected display in the menu window moves in the corresponding direction (+X direction, −X direction, +Y direction, or −Y direction). The item to be selected and finalized in the above-described menu window may include, for example, the image adjustment and setting mode, and the like. In response that the edge in +X side or −X side of the cursor 76 is pressed down, the volume of the sound (loudness of sound) outputted from the speaker 18 is adjusted.

The menu button 78 is arranged in −X, −Y side of the cursor 76 on the upper wall 38 of the housing 12. The menu button 78 is an operating member for calling the menu window on the screen S (see FIG. 11, FIG. 12). The menu button 78 has a part to be pressed (upper part) including a circular part in the plane view, and the part to be pressed is inserted coaxially and vertically movably in a circular opening 78a that is larger than the part to be pressed and is formed at a region near and in −X, −Y side of the circular opening 74a on the upper wall 38 of the housing 12. The menu button 78 is applied with a force upward by a spring and the like. In response that the menu button 78 is pressed down against the upward applied force, the display/not display of the menu window on the screen S is switched.

In response that each of the above-described operating members is pressed down, the operating terminal (not illustrated), positioned right below, mounted on the not-illustrated substrate of the control unit 20 is pressed down, the instruction signal unique to that operating member is outputted to the control unit 20, and the unique instruction content (function) is executed by the control unit 20. When the above-described operating members are not pressed down, their upper surfaces are positioned slightly above the upper surface of the upper wall 38 of the housing 12.

The operating members are of the same color as the upper wall 38 of the housing 12 (for example, black) to fit in the upper wall 38. In contrast, as can be seen from FIG. 5, an annular gap is formed in the plane view between each operating member and its peripheral (the part defining the circular opening into which the part to be pressed of that operating member is inserted), which makes it easier for the user to know the position of the above-described respective operating members. Then, with respect to the cursor 76 and the menu button 78 that have the close functional relationship each other, the gaps formed with the respective ones and their peripherals continue via a groove formed on the upper wall 38, so that the user can know their positional relationship at a glance.

The remote controller described before has press buttons, for example, on its body that have the same functions (operations) as the above-described respective operating members.

As illustrated in FIG. 6 and FIG. 7, the upper edge part of the rear wall 42 of the housing 12 is provided with an inclined part 44. The mirror 97 (see FIG. 3) that is a part of the projection optical system 16 is arranged inside the housing 12 at the inclined part 44.

As illustrated in FIG. 6, an intake port 17 is provided at the center of the right side wall (the side wall in +X side) 48 of the housing 12. The intake port 17 includes multiple through holes (vent holes) 17a.

The outer edge of the intake port 17 is defined by a frame unit 23 fixed to the peripheral of the pentagonal opening formed on the right side wall 48 of the housing 12. The multiple through holes 17a of the intake port 17 are formed (partitioned) by the frame unit 23 and a lattice unit 21 disposed within the frame unit 23.

The frame unit 23 includes, for example, a frame-like part of substantially a pentagon in the side view seen from the +X direction. The area of the pentagon surrounded by the frame unit 23 is set to, for example, one-third of the area of the outer wall of the right side wall 48 of the housing 12. The frame unit 23 slightly juts out (in +X side) over its peripheral (the outer wall surface of the right side wall 48 of the housing 12).

Figure 9:
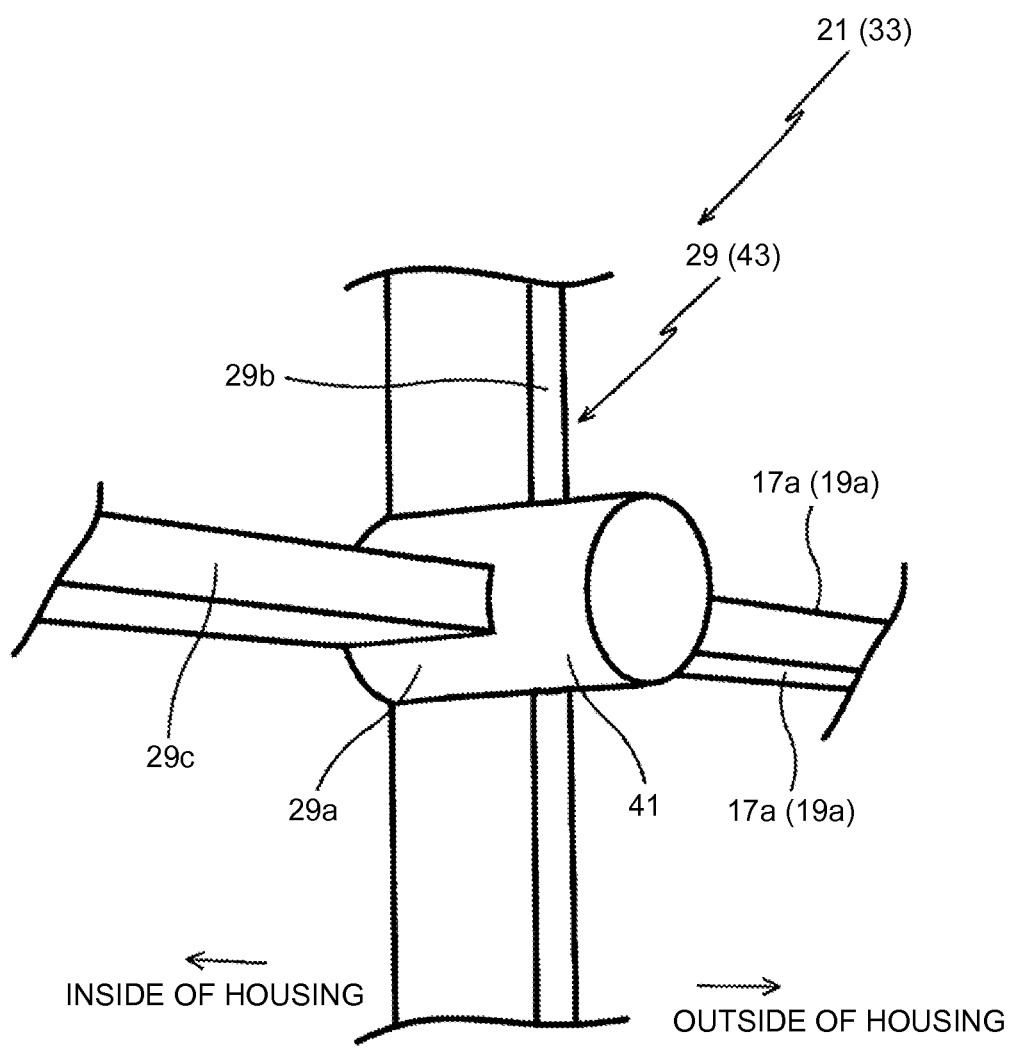
FIG. 9 is a perspective view extracting a part of a lattice unit formed on a housing of the projector.

As can be seen from the combination of FIG. 6 and FIG. 9, the lattice unit 21 includes a lattice body 29 including a two-dimensional lattice with an even thickness (the length in the X axis direction) that includes multiple vertical lattice lines 29b arranged at a constant interval in parallel to the X-Z plane and in the Y axis direction and multiple horizontal lattice lines 29c arranged at a constant interval in parallel to the X-Y plane and in the Z axis direction; and cylindrical parts 29a provided at the intersections of the vertical lattice lines 29b and the horizontal lattice lines 29c of the lattice body 29 (the intersections in the lattice).

Multiple, for example 169, the cylindrical parts 29a are provided in a matrix viewed from the +X direction. As illustrated in FIG. 9, the end in +X side of each cylindrical part 29a has a cross section of the circle whose diameter is larger than the square at the intersection of the vertical lattice line 29b and the horizontal lattice line 29c that are respectively a part of the lattice body 29, which forms a protruding portion 41 protruding in −X side from the lattice body 29. Hereafter, for the sake of convenience, the protruding portion 41 is referred to also as cylindrical protrusion 41. The remaining part of each cylindrical part 29a excluding the protruding portion 41 includes a part in which a cross-shaped groove having a predetermined depth at the center of the cylindrical part 29a is formed (see FIG. 14), and covers the corner portions that are formed by the intersection of the vertical lattice line 29b and the horizontal lattice line 29c that are orthogonal to each other such that the four through holes 17a partitioned are formed (the hatched part in FIG. 14).

In the present embodiment, the lattice body 29 and the cylindrical parts 29a are integrally molded to form the lattice unit 21. It is noted that, the lattice body 29 and the cylindrical parts 29a are not limited to the above and may be separately molded and the cylindrical parts 29a may be fixed to the lattice body. In any case, the strength (rigidity) will be higher than the case without the cylindrical part 29a. Therefore, to have the same strength as the conventional lattice that would have no cylindrical part 29a, the thickness of the lattice body 29 can be thinner (that is, shorter in the length in the X axis direction). In this case, since an intake direction (venting direction) described later of the intake port 17 is in the X axis direction, the pressure loss caused by the intake can be reduced compared to the conventional lattice that would have the same opening area and the same strength. It is noted that "pressure loss" refers to a reduction in the pressure of a fluid caused by a frictional resistance between the fluid and an article (solid). Further, each cylindrical part 29a functions as a blind for preventing the components and the like of the housing 12 from being seen through the through holes 17a when viewed from +X side. The cylindrical parts 29a having the larger diameter can much exhibit the blind effect, however, because of the increased pressure loss described above, it is not practical to have the much larger diameter of the cylindrical parts 29a.

The lattice pitches in the lattice body 29 (the length between the axes of two cylindrical parts 29a adjacent in the Y axis or the Z axis) are the same as each other and set to, for example, approximately 6 mm.

The end surface (tip surface) in +X side of the cylindrical protrusion 41 is positioned inside the frame unit 23, more specifically, is slightly in −X side than the same plane as the end surface in −X side of the frame unit 23 or that end surface. The diameter of the cylindrical protrusion 41 (cylindrical part 29a) is greater than the thickness of the lattice body 29.

Figure 10:
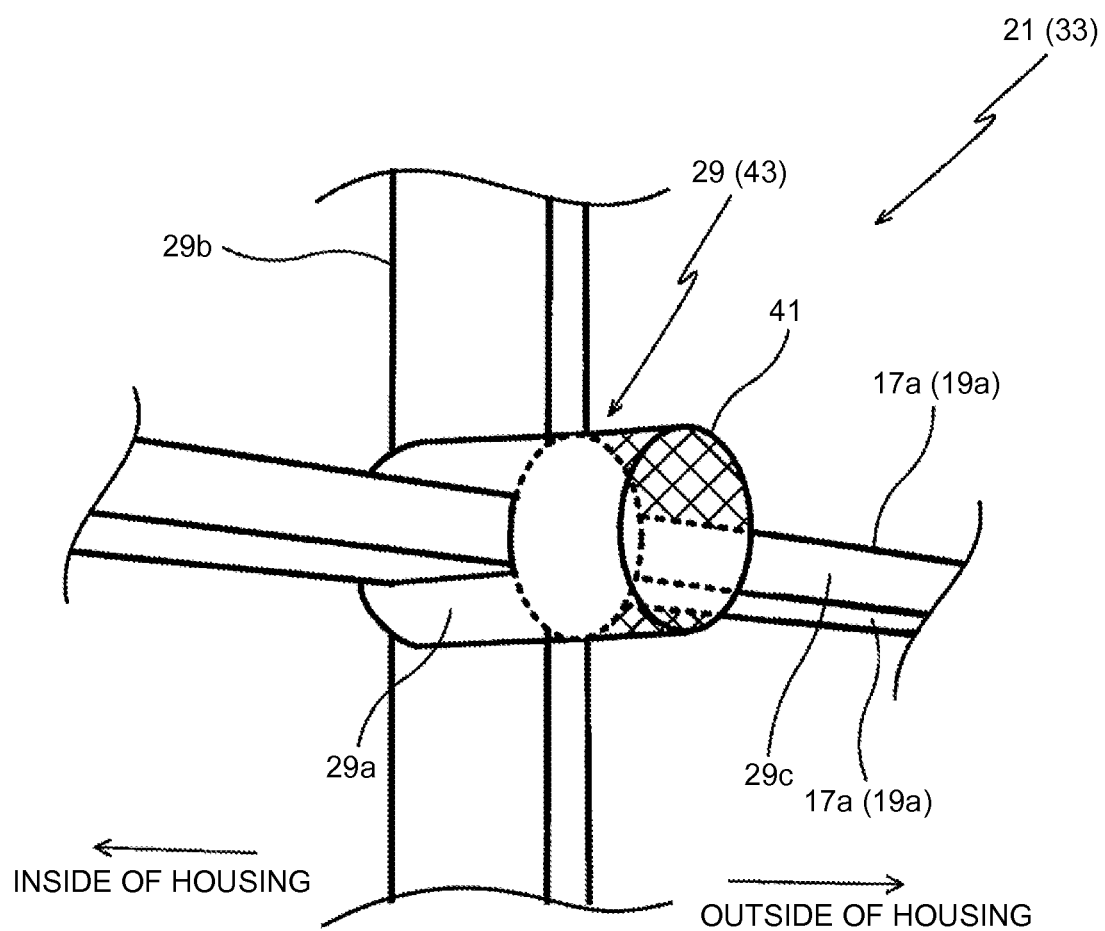
FIG. 10 is a diagram for illustrating a blind function of protrusions of the lattice unit.

Here, when the housing 12 is viewed from the oblique direction of +X side (for example, the oblique direction in +X, −Y side, the oblique direction in +X, +Y side, the oblique direction in +X, +Z side, the oblique direction in +x, −Z side) (see FIG. 1), a part of each through hole 17a (for example, the region corresponding to the hatched part in FIG. 10) of the intake port 17 is hidden behind the cylindrical protrusions 41 positioned around the through hole 17a and thus cannot be seen. That is, the cylindrical protrusions 41 function as the blind for preventing the components and the like of the housing 12 from being seen through the through holes 17a.

When the housing 12 is viewed from the oblique direction of +X side, the shorter the length in the X axis direction of the lattice body 29 (the length in the direction along the penetrating direction of the through hole 17a) is, or the longer the lattice pitch in the lattice body 29 is, the wider the area in the housing 12 viewed through each through hole 17a will be.

Therefore, in order to allow the cylindrical protrusions 41 to sufficiently function as the blind, the height and the diameter of the cylindrical protrusion 41 are required to set to the length according to the length in the X axis direction of the lattice body 29 and the lattice pitch. Specifically, when the length in the X axis direction of the lattice body 29 is shorter, or when the lattice pitch is longer, it is preferable to have at least one of the height (the length in the X axis direction) and the diameter of the cylindrical protrusion 41 be greater (longer).

However, the greater the diameter of the cylindrical protrusion 41 (cylindrical part 29a) is, the smaller the opening area of the intake port 17 will be (see FIG. 14). Here, when the fan 15 is driven at a predetermined rotational speed, the larger opening area of the intake port 17 causes the gas (outside air) to flow at a lower speed into the housing 12 through the intake port 17. Therefore, the larger opening area of the intake port 17 allows the intake noise (including the wind noise at the intake port 17) to be reduced. It is noted that the opening area of the intake port 17 can be derived by subtracting the Y-Z cross section area of the cylindrical protrusions 41 (and the cylindrical parts 29a) and the lattice body 29 from the pentagonal area surrounded by the frame unit 23.

Therefore, in the present embodiment, in order to obtain necessary and sufficient blind effect without increasing the pressure loss as far as possible and without reducing the opening area of the intake port 17 as far as possible, the height of the cylindrical protrusions 41 is set to, for example, one-third to two-thirds (approximately 2 mm to 4 mm) of the thickness (the length in the X axis direction) of the lattice body 29 and the diameter of the cylindrical protrusion 41 is set to, for example, one-third to two-thirds (approximately 2 mm to 4 mm) of the lattice pitch in the lattice body 29.

Further, the Y-Z cross section area of the vertical lattice lines 29b and the horizontal lattice lines 29c is set to the size by which necessary and sufficient rigidity can be obtained without reducing the opening area of the intake port 17 as far as possible. As described above, in the intake port 17, the area of the pentagon surrounded by the frame unit 23 is very large (for example, one-third of the area of the outer wall of the side wall 48 in +X side). Therefore, the opening area of the intake port 17 is much larger for the size (volume) of the housing 12.

Returning to FIG. 6, the right side wall 48 of the housing 12 is provided with the connector unit 8 under the intake port 17 described above. The connector unit 8 includes a plurality of (for example, seven) connectors. The plurality of (for example, seven) connectors are the connection terminals for the connection to the external devices (including the external memory) or the external power source each connected to the control unit 20 (see FIG. 2).

Six out of seven connectors are disposed in two lateral rows within a recess part 50 that is, for example, polygonal (for example, pentagonal) in the side view seen from the +X direction formed in the region in −Y side at the lower part of the right side wall 48 of the housing 12. It is noted that the shape in the side surface of the recess part 50 is not limited to the polygon and may be a circle, an ellipse, and so on.

In the upper row in the recess part 50, aligned are a USB terminal 52 for input and output with the external device (including, for example, the external memory such as USB memory and the like) and an HDMI terminal 54 for connection with the AV device, in this order from −Y side to +Y side. In details, the USB terminal 52 and the HDMI terminal 54 are respectively inserted from inside the housing 12 within openings that are slightly larger than the respective terminals and are formed in the upper part of the inner bottom of the recess part 50.

In the lower row in the recess part 50, aligned are a LAN terminal 56 for communication; a computer terminal 58 for inputting RGB signals from a personal computer or component video signals from a video device (for example, a DVD recorder) and the like; a video input terminal 60 for inputting a video signal from a video device and the like; and an audio input terminal 62 for inputting an audio signal from the personal computer, the video device and the like, in this order from −Y side to +Y side.

In details, the LAN terminal 56 is inserted from inside the housing 12 within an opening that is slightly larger than the LAN terminal 56 and is formed in the lower part of the inner bottom of the recess part 50. The computer terminal 58, the video input terminal 60 and the audio input terminal 62 are respectively penetrated from inside the housing 12 within openings that are slightly larger than the respective terminals and are formed in the inner bottom of the recess part 50. While not illustrated, each end (the end in +X side) of the computer terminal 58, the video input terminal 60 and the audio input terminal 62 is positioned within the recess part 50 (does not jut out over the recess part 50).

One remaining connector of the seven is a power supply terminal 64 for connection with the external power source (connector for the power supply). Here, a recess part 66 that is deeper in depth (the size in the X axis direction) than the recess part 50 is formed at the part where the right side wall 48 and the rear wall 42 of the housing 12 intersect, that is, formed near the lower end of the corner at +X, +Y side of the housing 12 (the part in +Y side of the recess part 50). In other words, the recess part 66 is open to +X side and +Y side. The power supply terminal 64 is inserted from inside the housing 12 within an opening 66a that is slightly larger than the power supply terminal 64 and is formed in the inner bottom of the recess part 66. The power supply terminal 64 is formed with insertion holes 64a into which a plurality of (for example, three) electrodes (not illustrated) of a terminal 7a of a power cable 7 (see FIG. 13) are inserted, respectively. As can be seen from FIG. 13, in a state where the terminal 7a of the power cable 7 is inserted (connected) to the power supply terminal 64, a part of the portion holding three electrodes in the terminal 7a (for example, the front half portion) is inserted into the recess part 66. This prevents the removal of the power cable 7.

It is noted that, although the plurality of connectors in the connector unit 8 are inserted in the opening formed in the right side wall 48 of the housing 12 in the present embodiment, alternatively, it may be possible to prepare a member for attaching the connector, such as a panel box to which a plurality of connectors are inserted and form an opening on the right side (side wall in +X side) of the housing 12, and attach the member for attaching the connector to that opening.

As illustrated in FIG. 2, the speaker 18 is connected to the control unit 20. When the control unit 20 receives the audio signal from the external device (for example, the DVD video recorder R, the personal computer C) connected to the HDMI terminal 54 and/or the audio input terminal 62 described above via an audio cable or the USB memory M connected to the USB terminal 52, it transmits the audio signal to the speaker 18. The speaker 18 converts the audio signal into sound to output it, and the outputted sound is discharged to outside the housing 12 through the sound discharging opening 30 (see FIG. 4).

As illustrated in FIG. 7, an exhaust port 19 is formed on the upper part of the left side wall (side wall in −X side) of the housing 12. The exhaust port 19 includes multiple through holes 19a.

The outer edge of the exhaust port 19 is defined by a frame unit 35 fixed around the substantially square opening formed in a left side wall 31 of the housing 12. The multiple through holes 19a of the exhaust port 19 are formed (partitioned) by the frame unit 35 and a lattice unit 33 formed within the frame unit 35.

The frame unit 35 includes, for example, a frame-like part with substantially square shape in the side view from the −X direction, and plural parts of the peripheral of the lattice unit 33 are connected thereto. The area of the square surrounded by the frame unit 35 is set to be approximately one-third of the area of the outer wall surface of the left side wall 31 of the housing 12 (however, slightly smaller than the area of the pentagon surrounded by the frame unit 23 described above). The frame unit 35 slightly juts out (−X side) over its peripheral.

As illustrated in FIG. 9, the lattice unit 33 has a lattice body 43 including a two-dimensional lattice with an even thickness (the length in the X axis direction) and cylindrical parts 29a each provided at each intersection in the lattice of the lattice body 43.

As illustrated in FIG. 7, multiple, for example 143, cylindrical parts 29a are provided in a matrix viewed from the +X direction. As illustrated in FIG. 9, the end in +X side of each cylindrical part 29a has a cross section of the circle whose diameter is larger than the square at the intersection of the vertical lattice line 29b and the horizontal lattice line 29c that are respectively a part of the lattice body 29, which forms the protruding portion 41 protruding in −X side from the lattice body 29.

The lattice unit 33 has the same arrangement (including the positional relationship with the surrounding frame unit) and function as the lattice unit 21 except that the contour and the arrangement of each part are different. It is noted that respective components of the lattice unit 33 (the vertical lattice line, the horizontal lattice line, and the cylindrical part) are represented by the same numeral reference as that for the lattice unit 21. It is noted that the opening area of the exhaust port 19 are much larger for the size (volume) likewise the opening area of the intake port 17 (however, slightly smaller than the opening area of the intake port 17).

When the fan 15 is driven at a predetermined rotational speed, the larger opening area of the exhaust port 19 causes the gas (outside air) to flow at a lower speed into the housing 12 through the exhaust port 19. Therefore, the larger opening area of the exhaust port 19 allows the exhaust noise (including the wind noise at the exhaust port 19) to be reduced.

Figure 8:
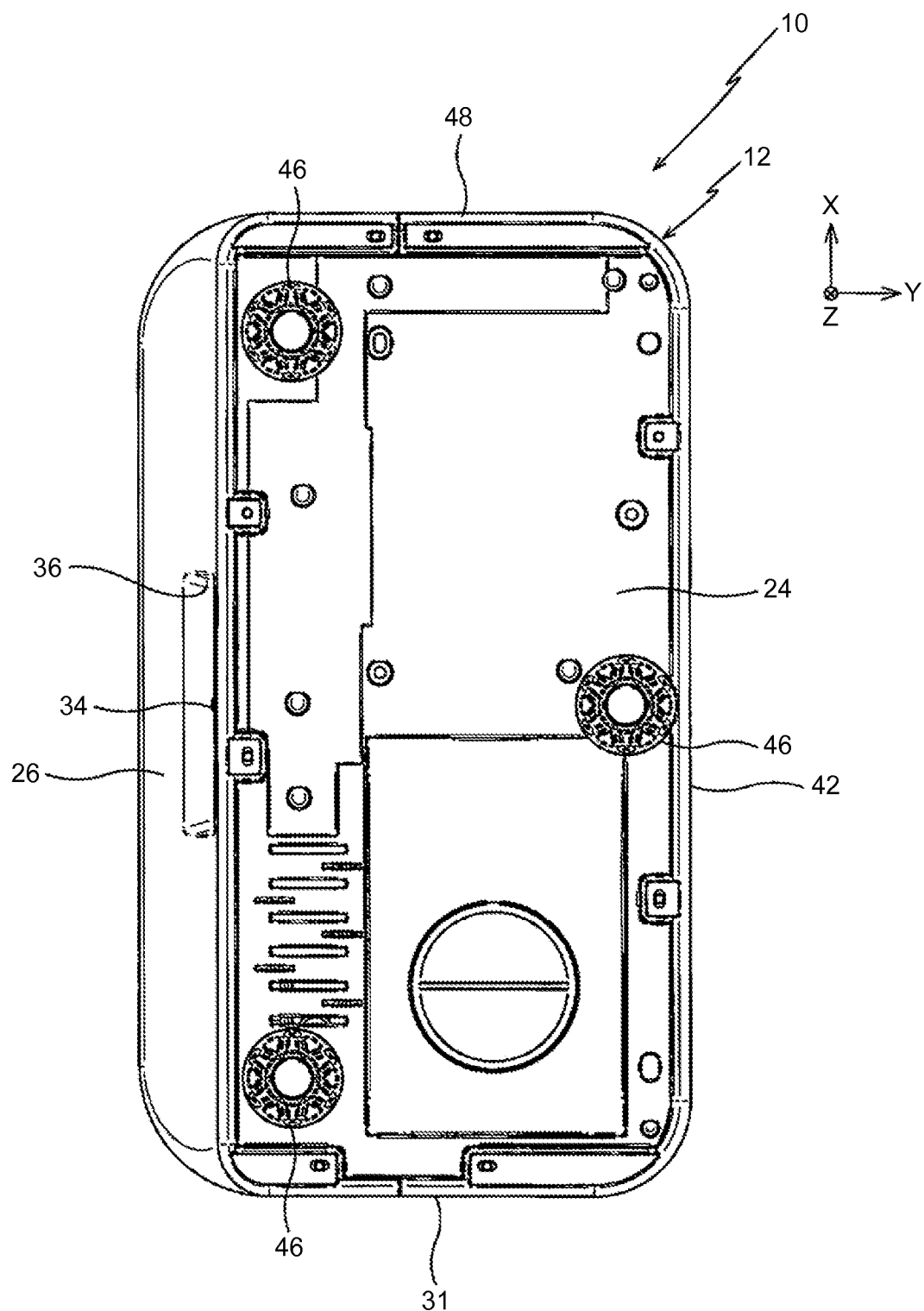
FIG. 8 is a bottom view of the projector.

As can be seen from the combination of FIG. 4 and FIG. 8, the bottom wall 24 of the housing 12 is provided with at least three (for example, three) short leg members 46 that are not on the same line.

Here, in the projector 10, respective components are arranged in the housing 12 such that the weight balance comes to −Y side (the −Y side is heavier than the +Y side). That is, the center of gravity of the projector 10 is positioned in −Y side of the center of the housing 12, for example.

In the present embodiment, as illustrated in FIG. 8 as an example, two of the three leg members 46 are disposed at the corner in −Y, +X side and the corner in −Y, −X side of the bottom wall 24 of the housing 12, respectively, and the remaining one is disposed at the center of the end in +Y side of the bottom wall 24 of the housing 12. This allows the projector 10 to be stably supported at three points through the three leg members 46 on a particular horizontal surface (difficult to fall). It is noted that, in short, the positions of three leg members 46 are not limited to the above as long as they are set to appropriate positions according to the weight balance of the projector 10.

Each of the three leg members 46 includes a disc-like member (member of gear wheel shape) whose axis direction is substantially in the Z axis direction and on the surface of which concaves and convexes are formed, and is attached to the bottom wall 24 of the housing so that the height can be adjusted in a screw-on manner. That is, as respective three leg members 46, so called adjuster is used. Therefore, the user can adjust the attitude (inclination) of the housing 12 by rotating each leg member 46 with respect to its axis line to adjust its height, which allows the user to adjust the projection angle of the light projected outside the housing 12 through the light projection opening 40. In this case, each leg member 46 includes the member of gear wheel shape as described above, which provides the better fitting to the finger and allows for the easier adjustment of its height.

The method of using the projector 10 as configured above will be described below. The description will be provided as an example for a case where the projector 10 is used in a meeting attended by plural members.

A plurality of (for example, seven) participants sit in the chairs in +X side, −X side, and −Y side of a table T, facing the table T that is arranged in the meeting room and whose longitudinal direction is in the Y axis direction and shape is a square in the plane view.

The screen S is provided in a tense state along the wall W near −Y side of the wall W positioned in +Y side of the table T. The projector 10 is set on the pedestal P arranged at the position near the lower part of the wall W (lower part of the screen S) by the user (one of the participants in the meeting) (see FIG. 13).

Then, for example, the user (one of the participants in the meeting) may hold the part including the step 26c (see FIG. 6 and FIG. 7) of the housing 12 to carry the projector 10, and set it on the pedestal P such that the front of the housing 12 (the outer wall surface of the side wall 26 in −Y side of the housing 12) faces in the −Y direction and the housing 12 is spaced apart from the wall W (such that the size of the window projected on the screen S becomes a desired size) by a predetermined distance (for example, a few cm) (see FIG. 12). In this case, since the inclined part 44 is provided between the upper wall 38 and the side wall 42 in −Y side of the housing 12 (see FIG. 6 and FIG. 7), the user can easily check the distance between the housing 12 and the wall W from the upper direction of the housing 12, which allows for the easier setting of the projector 10.

Since the projector 10 is of vertical stand type and, in particular, the length of the depth direction (the Y axis direction) is short, it has an excellent space efficiency when set close to the wall W. In other words, the wider space between the projector 10 and the table T can be ensured compared to, for example, the horizontal stand type projector whose length in the depth direction (the Y axis direction) is longer, so that the projector 10 will not be an obstacle when a person walks in this space, for example.

After the setting of the projector 10, the user may adjust the height of at least one of the three leg members 46 (see FIG. 8) to adjust the attitude (inclination) of the housing 12 as needed. In this case, in the projector 10, two leg members 46 are positioned at the end of −Y side of the bottom wall 24 (far end from the wall W) of the housing 12 spacing apart from each other in the X axis direction, and the remaining leg member 46 is positioned at the end of +Y side of the bottom wall 24 (near end from the wall W). Therefore, the user can easily adjust the attitude (inclination) of the housing 12 by positioning itself in −Y side of the housing 12 and adjusting the height of at least one of the two leg members 46 in −Y side with reference to the height of the one leg member 46 in +Y side, which allows for the easier adjustment of the projection angle of the light from the light projection opening 40.

Figure 13:
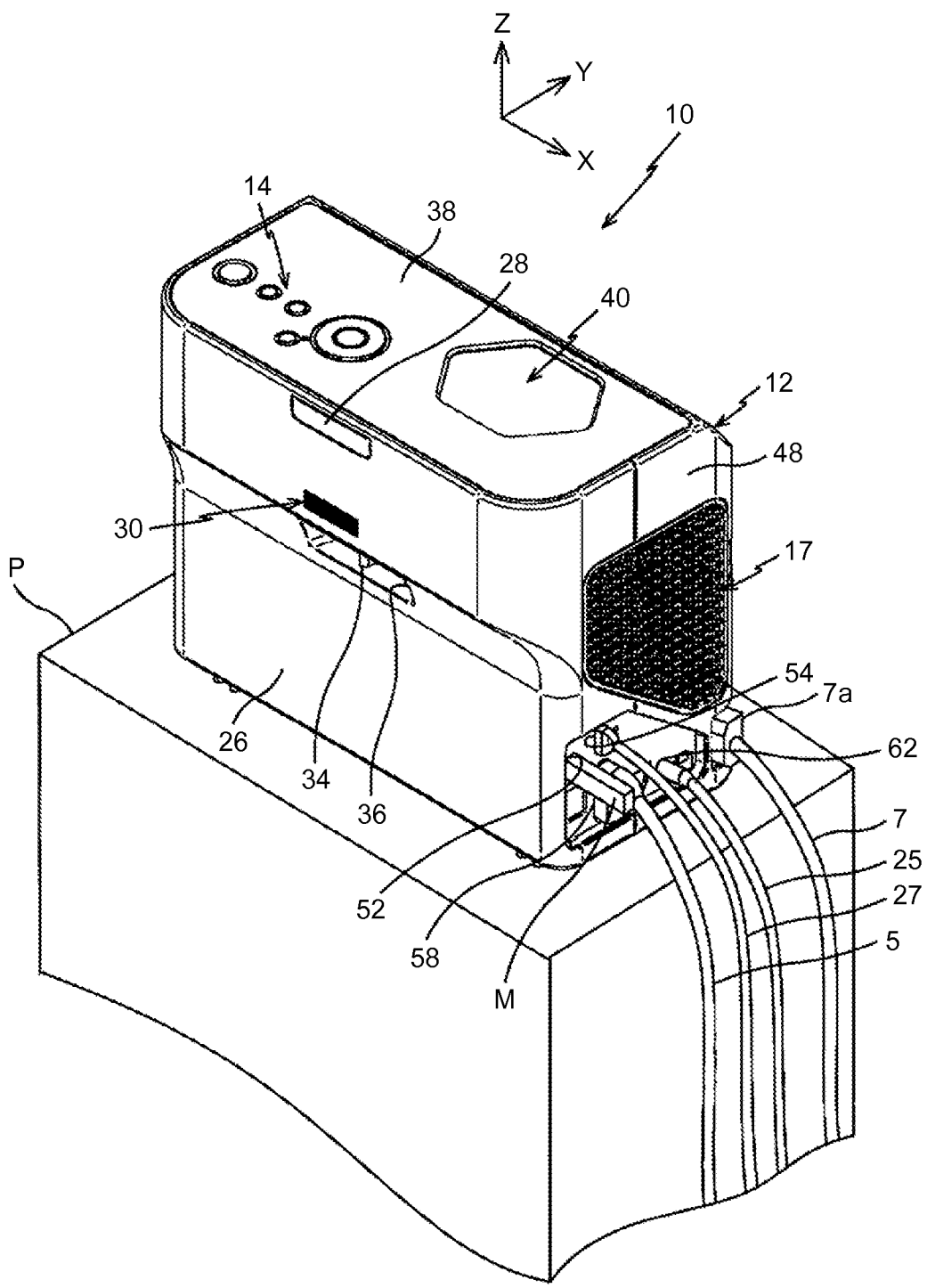
FIG. 13 is a diagram for illustrating a state where cables are connected to a plurality of connectors provided on the housing.

Also, after the setting of the projector 10, the connecting of the cables corresponding to the plurality of connectors is made (see FIG. 13). Specifically, first, the user may connect the power cable 7 to the power supply terminal 64 (see FIG. 6). This connecting is made by inserting three electrodes (not illustrated) of the terminal 7a of the power cable 7 into the corresponding insertion holes 64a of the power supply terminal 64. In this case, although the power cable 7 will hang down from the housing 12, a part of the portion holding three electrodes of the terminal 7a is fitted into the recess part 66, so that removal of the power cable 7 is prevented.

Here, the personal computer C, the USB memory M, the HDMI terminal-mounted DVD video recorder R may be used as examples of the external devices or the external memory to be connected to the projector 10 (see FIG. 2, FIG. 11). The personal computer C and the DVD video recorder R are placed on the table T, respectively, and operated by the participants in the meeting.

Then, the user may connect to the audio input terminal 62 the other end (the other terminal) of an audio cable 25 whose one end (one terminal) is connected to the audio output terminal of the personal computer C. Further, the HDMI terminal 54 is connected with the other end (the other terminal) of an HDMI cable 27 whose one end (one terminal) is connected to the DVD video recorder R. Further, the computer terminal 58 is connected with the other end (the other terminal) of an RGB cable 5 whose one end (one terminal) is connected to the RGB output terminal of the personal computer C. Further, the USB terminal 52 is connected to the terminal of the USB memory M. In this case, since the plurality of connectors are arranged within a predetermined region of the side wall 48 in +X side of the housing 12, the user can easily connect respective terminals of the cables and the memory to the corresponding connectors without confusion. It is noted that, as described above, for the cables whose one ends are connected to the projector 10 and the other ends are connected to the external devices, the parts between the one ends and the middle parts thereof will hang down in +X side of the housing 12 and the pedestal P (see FIG. 13), the middle parts will run on the floor F (see FIG. 12), and the parts between the middle parts and the other ends will hang down from the table T.

Upon the completion of the connection for the projector 10, the user may start up the personal computer C and the DVD video recorder R to establish a state where their image information and audio information can be transmitted to the projector 10.

Then, the user may press the power button on the operating unit 14 or the remote controller to start up the projector 10. Here, the user may switch the input to the projector 10 to the personal computer C, the DVD video recorder R or the USB memory M by pressing the input button 70. Thereby, the image information and the audio information from the personal computer C, the DVD video recorder R or the USB memory M are transmitted to the control unit 20, the light source 80 is driven by the control unit 20, and the audio information is transmitted to the speaker 18. It is noted that the operation using the remote controller is done in response that the intended operation button of the remote controller is pressed with the transmission unit of the remote controller being directed to the light receiving sensor unit 28.

Upon the light source 80 being driven, the light is emitted from the light source 80, and is then guided to the light projection opening 40 (see FIG. 5) via the color wheel 82, the light tunnel 84, the condenser lenses 86 and 88, the mirrors 90 and 92, the DMD 94, the projection lens 96, the mirror 97, and the free-form surface mirror 98 as described above (see FIG. 3). The guided light is projected to the obliquely upward in +Y, +Z side of the housing 12 (obliquely upward from the outer wall surface of the side wall 42 in +Y side) via the light projection opening 40 (see FIG. 12). This allows a large, color (or monochrome) image to be projected on the screen S. In this case, the projector 10 is arranged close to the screen S, there are few opportunities of an object or a person comes into the light path of the projected light, which can significantly prevent the projected light from being blocked.

Then, the user may adjust the focal point position of the projection lens 96 by revolving the focus adjustment lever 34 along the side wall 26 in −Y side of the housing 12 to adjust the focal point position of the image projected on the screen S. Since the focus adjustment lever 34 is provided that is able to be revolved with respect to the Z axis at the center of the side wall 26 in −Y side of the housing 12, the user can easily operate (revolve) the focus adjustment lever 34 even when positioning itself at any position in +X side, −X side, and −Y side of the housing 12.

The user may press down the menu button of the operating unit 14 or the remote controller as needed along with the above described focus adjustment of the image to display the items to be selected on the screen S, press the cursor 76 and the enter button 74 to select and finalize the image adjustment setting mode, for example, to adjust the size, the position, the intensity, the contrast, the color strength, and so on of the image.

On the other hand, the audio information is transmitted to the speaker 18, the audio information is converted into the sound by the speaker 18 and outputted, the outputted sound is discharged to outside the housing 12 through the sound discharging opening 30. It is noted that the volume of the sound outputted from the speaker 18 can be adjusted by the operation of the cursor of the operating unit 14 or the remote controller.

In such the way, the participants in the meeting can view the image and listen to the sound outputted from the projector 10.

Further, the user can temporarily mute the image and sound outputted from the projector 10 by pressing the mute button of the operating unit 14 or the remote controller during the meeting and, for example, can temporarily project the image by other projector, the OHP, and the like on the screen S.

Further, upon the projector 10 being started up, the large fan 15 of the cooling unit 22 (see FIG. 2) is driven at a low rotation, the air (outside air) flows into the duct (into the housing 12) through the intake port 17, passes by each heat sink, and flows out of the duct (outside the housing 12) through the exhaust port 19 taking in the heat radiated from the heat sink. This allows the heat generating elements such as the CPU 11 and the light source 80 to be efficiently cooled and thus prevents malfunction of the CPU 11, exhaustion and damage of the light source 80, and so on.

In this case, since the cables respectively connected to the plurality of connectors are positioned under the intake port 17 (see FIG. 13), the flow of the air into the duct through the intake port 17 are not obstructed by these cables.

Here, a case is expected where the cable or the memory is inserted to and removed from at least one of the connectors of the connector unit 8 in order to add or change the external device (including the external memory) to be connected to the projector 10. In this case, the user will position itself in approximately −Y side to insert and remove the cable and the like. Then, the insertion and removal of the cable is usually done with holding the terminal of the cable by its hand in order to avoid the breaking of wire. In addition, the examples of the external devices to be added or changed may include a personal computer, USB memory, a DVD video recorder, a liquid crystal monitor, an audio amplifier, a DVD player, a video deck, and so on.

In the connector unit 8, as illustrated in FIG. 13, a plurality of (six) connectors which are expected to be subjected to relatively frequent insertion and removal of the cable and the like are located in −Y side region of the side wall 48 in +X side of the housing 12, that is, the near side viewed from the user, which allows for the smooth (easy) insertion and removal. In particular, since the USB terminal 52 is arranged in the most −Y, +Z side, when the USB memory M, for example, is inserted to and removed from the USB terminal 52, the cables connected to other connectors will not be an obstacle.

In contrast, the power supply terminal 64, which the cable (power cable 7) is expected to rarely be inserted to and removed from, is located in the most +Y side of the side wall 48 in +X side of the housing 12, that is, the most back side viewed from the user. Therefore, when the cables are being taken out from and put into the six connectors other than the power supply terminal 64, the power cable 7 connected to the power supply terminal 64 will not be an obstacle. Further, the terminal 7a of the power cable 7 is located at the most back side viewed from the user who takes out and puts in the cable and the like, which prevents the power cable 7 from being unplugged carelessly (by mistake) due to confusion with other cables.

Further, if the connector unit were provided on the side wall 26 in −Y side of the housing 12, the cables connected to the connectors (see the double dotted line in FIG. 12) would hang down in −Y side of the housing 12 and thus, for example, if a person walked in near the −Y side of the projector 10, the cables would be likely to be an obstacle such that his or her foot might be tangled in the cables. In the present embodiment, the cables connected to the connectors (the RGB cable 5 only is exemplarily illustrated in FIG. 12) are hang down in +X side of the housing 12, which prevents the cables from being an obstacle such as that the foot would otherwise be tangled in the cable even when a person walks in near the −Y side of the housing 12.

As set forth above, the projector 10 is used in the meeting. After the meeting finishes, the user may press the power button on the operating unit 14 or the remote controller to stop the power supply to the projector 10 and remove (pull out) the cables connected to the plurality of connectors.

According to the projector 10 of the present embodiment described above, the housing 12 has the frame unit and the lattice body provided with the vent hole (the intake port 17 or the exhaust port 19) including multiple through holes, and the multiple protruding portions 41 protruding along the vent direction (the X axis direction) of the vent holes from the lattice body.

In this case, the multiple protruding portions 41 protrude along the vent direction of the vent hole, so that the pressure loss of the airflow can be reduced compared to the case where multiple louvers (plate-like members) inclined to the vent direction of the vent hole are provided adjacent to the vent hole as in the electronic device (projector), for example, as disclosed in Japanese Patent Application Laid-open No. 2003-287816. Further, when the housing 12 is viewed from any oblique direction in its +X side (in the side of the intake port 17) or −X side (in the side of the exhaust port 19) (the direction except the horizontally lateral direction (+X direction or −X direction)), a part of each through hole of the vent hole is hidden behind the protruding portions 41 positioned its peripheral, and thus the inside of the housing 12 is not likely to be seen through each through hole. Therefore, the pressure loss of the airflow can be reduced while the blind effect is obtained.

Further, according to the projector 10, a cylindrical part 29a is provided at each intersection in the lattice to strengthen that part, so that the rigidity can be sufficiently maintained even if the thickness of the lattice body is small (even if the length of the X axis direction (the vent direction of the vent hole) is short) and the inside of the housing 12 is not likely to be seen through each through hole because of the existence of the cylindrical protrusions 41. Therefore, the pressure loss of the airflow can be further reduced while the blind effect is obtained.

Furthermore, as described above, the protruding portions 41 can hide not only the inside of the housing 12 but also the through holes themselves of the vent hole (the intake port 17 or the exhaust port 19), so that the presence of the intake port 17 and the exhaust port 19 can be significantly reduced, which prevents the appearance from being spoiled.

Moreover, in the lattice units 21 and 33, since the cylindrical protrusions 41 protrude from each intersection in the lattice of the lattice body, the lattice unit 21 and lattice unit 33 can be seen as a kind of unique pattern drawn in the housing 12 (see FIG. 1). Accordingly, in the projector 10, the lattice units 21 and 33 give not only the blind effect but also a well-designed appearance.

Figure 17:
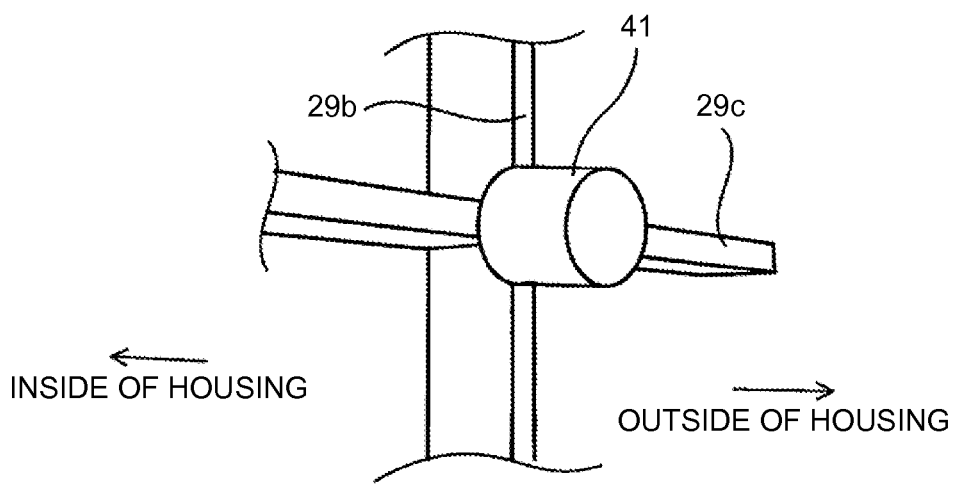
FIG. 17 is a perspective view extracting a part of the lattice unit according to a third modification.

Further, each intersection of the lattice is provided with a cylindrical part 29a having a part covering outside the intersection of the lattice of the lattice bodies 29 and 43, so that the rigidity at the boundary of the cylindrical protrusions 41 and the lattice body can be enhanced compared to the case where the cylindrical protrusions 41 are attached to the lattice body on one surface, for example (see FIG. 17).

Further, in the projector 10, as described above, the opening areas of the intake port 17 and the exhaust port 19 are very large for the size (volume) of the housing 12. Thus, in response that the fan 15 is driven, the air flows into the housing 12 at a low speed through the intake port 17 and flows out of the housing 12 at low speed through the exhaust port 19. Therefore, the intake noise and the exhaust noise can be reduced.

Furthermore, as described above, since the fan 15 is driven at a low rotation, the driving noise (including the wind noise) of the fan 15 can be reduced, and the speed of the airflow through the intake port 17 and the speed of the airflow through the exhaust port 19 are further decreased, so that the intake noise and the exhaust noise can be further reduced.

Moreover, in the usage condition of the projector 10 as illustrated in FIG. 11, the intake direction (the arrow IN, in FIG. 11) for the intake port 17 and the exhaust direction (the arrow OUT, in FIG. 11) for the exhaust port 19 are not directed to the participants of the meeting. Therefore, the intake noise and the exhaust noise (including the wind noise at the fan 15, the intake port 17, and the exhaust port 19) are not likely to be heard by the participants of the meeting all the more, and the heated air exhausted through the exhaust port 19 does not blow to the participants of the meeting.

Further, the heated air including the heat radiated from each heat sink connected to the heat generating part such as the CPU 11, the light source 80, and so on is exhausted in −X side of the housing 12 (see the arrow OUT, in FIG. 11) through the exhaust port 19 formed in the side wall 31 in −X side of the housing 12. On the other hand, the light modulated according to the image information is projected obliquely upward in +Z, +Y side of the housing 12 through the light projection opening 40 formed in the upper wall 38 of the housing 12 (see FIG. 12). That is, the flow-out path of the heated air exhausted through the exhaust port 19 is out of the light projection path from the light projection opening 40, so that the light according to the image information projected through the light projection opening 40 is prevented from swinging by the effect of the heated air. Furthermore, the light projection opening 40 is arranged closer to the side wall 48 in +X side (the side wall provided with the exhaust port 19) than to the side wall 31 in −X side (the side wall provided with the intake port 17) in the upper wall 38 of the housing 12 (see FIG. 5), so that it is not likely to be subjected to the effect of the heated air all the more.

As such, the projector 10 has all of the stable light projection performance, the sufficient cooling performance, the superior noise reduction, and the well-designed appearance.

Further, according to the projector 10, the plurality of press buttons (pressing-type operating members) are provided vertical-movably on the upper wall 38 of the vertical stand type housing 12.

In this case, since each press button is pressed by the external force in the vertical, downward direction, the gravity and the external force in the vertical, downward direction only are applied to the projector 10 when each press button is being pressed down. In other words, when each press button is being pressed down, neither external force in the horizontal direction nor the moment around the Z axis is applied, so that the misalignment of the housing can be prevented.

Here, since the housing 12 has the longer length in the height direction than the length in the Y axis direction of the bottom wall 24, the housing 12 is likely to be tilted, for example, with respect to the X axis direction with one of the leg members 46 in +Y side being a support point when the external force in the +Y direction is applied to the side wall 26 in −Y side of the housing 12.

In the present embodiment, as described above, the external force in the +Y direction is not applied to the projector 10 when each press button is being pressed down. Therefore, compared to the case where the press button were provided on the side wall 26 in −Y side so as to be pressed down in the +Y direction, the tilting (being unstable) and falling of the housing 12 can be prevented.

Further, since the focus adjustment lever 34 is operated by being revolved in the direction along the side wall 26 in −Y side of the housing 12, the external force in the Y axis direction and the moment around the Z axis are hardly applied to the center of gravity of the projector 10. Therefore, the misalignment of the housing 12 is prevented and the tilting (being unstable) of the housing 12 is also prevented.

Further, the X position of the focus adjustment lever 34 is substantially the same as the X position of the center of gravity of the projector 10, so that, when it is operated, misalignment is not likely to occur (not likely to rotate with respect to the Z axis, in particular) even when the force in the +Y direction is applied to the housing 12.

As such, in the projector 10, the press button as the operating member is arranged vertical-movably in the upper wall 38 of the housing 12, and the focus adjustment lever 34 as the operating member is arranged in approximately the X axis direction on the side wall 26 in −Y side of the housing 12 so as to be rotatable at a predetermined stroke, which can significantly prevent the housing 12 from being misaligned and being unstable when the operating members are operated.

Further, according to the projector 10, the light projection opening 40 is provided on the upper wall 38 of the housing 12, and the plurality of (seven) connectors of the connector unit 8 are provided on the side wall 48 in +X side of the housing 12. Then, the projector 10 is set at the position close to the projected surface on the screen S, and the wirings (cables) are connected to the plurality of connectors. In this case, the wirings connected to the plurality of connectors hang down from the side wall 48 in +X side. Therefore, this prevents the cables from being an obstacle such as that the foot would otherwise be tangled in the cable even when a person walks in near the −Y side of the projector 10 (the space between the projected surface of the screen S and the opposite side with respect to the housing 12).

Further, as described above, when the projector 10 is set close to the wall W on which the screen S is provided in a tense state, the power supply terminal 64 which the cable is least frequently removed from and inserted into the plurality of connectors of the connector unit 8 is positioned in the most +Y side (the wall W side), so that the power cable 7 connected to the power supply terminal 64 is not an obstacle and the power cable 7 is prevented from being pulled out by mistake. Accordingly, the cables and the like corresponding to the plurality of connectors can be smoothly inserted and removed.

Further, the plurality of connectors are arranged at the lower part of the side wall 48 in +X side of the housing 12, so that, when the cable and the like are inserted to and removed from (taken out and put in) the plurality of connectors, the moment to tile the housing 12 is not likely to generate and thus the housing 12 is prevented from being unstable, which allows the taking out and putting in of the cable and the like to be done smoothly.

The recess part 66 where the power supply terminal 64 is formed at the corner in +X, +Y side of the housing 12 and is open to not only in +X side but also in +Y side, so that the power cable 7 can be easily inserted to and removed from the power supply terminal 64.

As described above, in the projector 10, the user can smoothly insert the corresponding wirings to and remove them from respective connectors, so that the user can smoothly and quickly carry out the connection and the release of the connection between the projector 10 and the external devices before the meeting, during the meeting, and after the meeting, which allows for the smooth preparation, proceeding, and withdrawal of the meeting.

It is noted that the present invention is not limited to the above described embodiment and various modifications are possible. For example, the shape, the size, the number, the position of the multiple protrusions protruding from the lattice body are not limited to those described in the above embodiment.

Figure 18:
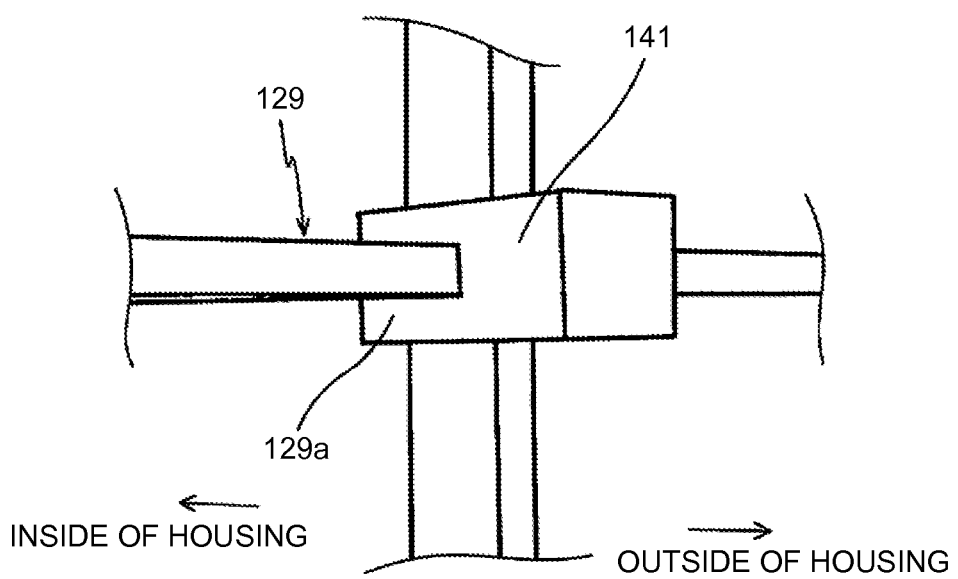
FIG. 18 is a perspective view extracting a part of the lattice unit according to a fourth modification.

Specifically, the shape of the multiple protrusions protruding from the lattice body is not limited to the cylindrical shape but may be other shapes. For example, it may be a prism (see FIG. 18), an elliptic cylinder, and the like, or a taper-up or taper-down shape such as a pyramid, a cone, elliptic cone, and the like.

Further, the multiple protrusions provided at the intersections in the lattice body may be different each other in shape, size, and/or position.

Although the cylindrical parts 29a including cylindrical protrusions 41 are provided to all the intersections in the lattice of the lattice body in the above embodiment, the arrangement is not limited to it as long as they are provided to at least one intersection in the lattice of the lattice body, in short.

Further, the height and the diameter of the cylindrical protrusion 41 is not limited to those described in the above embodiment, but may be modified as needed. That is, in the above embodiment, the height and the diameter of the cylindrical protrusion 41 are set to balance the reduction of the pressure loss of the airflow at the intake port and the exhaust port, the ensuring of the opening areas of the intake port and the exhaust port, and the blind effect (the height of the cylindrical protrusion 41 is, for example, one-third to two-thirds of the thickness (the length in the X axis direction) of the lattice body, and the diameter of the cylindrical protrusion 41 is set to, for example, one-third to two-thirds of the lattice pitch of the lattice body), but they are not limited to it. The height of the cylindrical protrusion 41 may be less than one-third or greater than two-thirds of the thickness (the length in the X axis direction) of the lattice body. Also, the diameter of the cylindrical protrusion 41 may be less than one-third or greater than two-thirds of the lattice pitch in the lattice body. Specifically, if the priority is the reduction of the pressure loss and the ensuring of the opening areas, the height of the cylindrical protrusion 41 may be, for example, less than one-third of the thickness (length in the X axis direction) of the lattice body and the diameter of the cylindrical protrusion 41 may be, for example, less than one-third of the lattice pitch in the lattice body. In contrast, if the priority is the blind effect, the height of the cylindrical protrusion 41 may be, for example, greater than two-thirds of the thickness (length in the X axis direction) of the lattice body and the diameter of the cylindrical protrusion 41 may be, for example, greater than two-thirds of the lattice pitch in the lattice body.

Figure 15A:
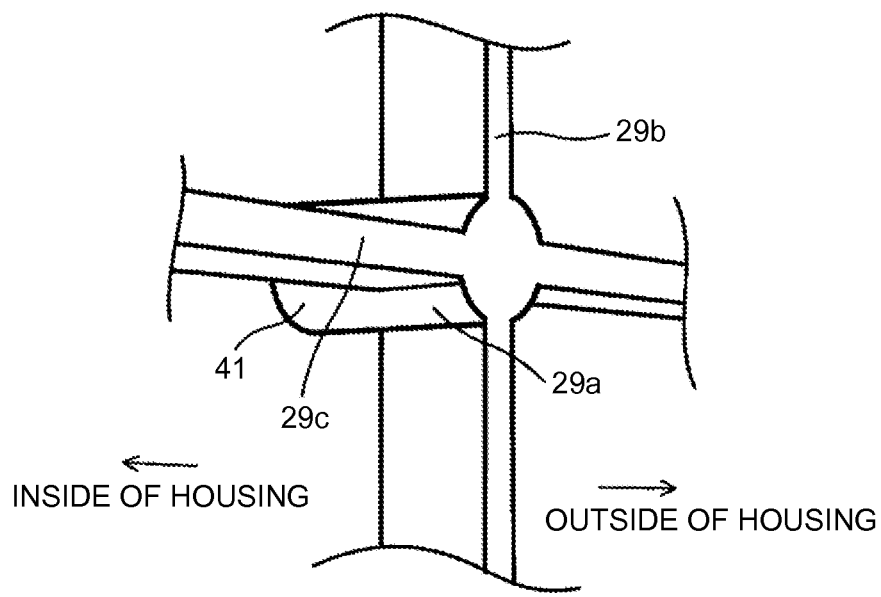
FIG. 15A is a perspective view extracting a part of the lattice unit according to a first modification.
Figure 15B:
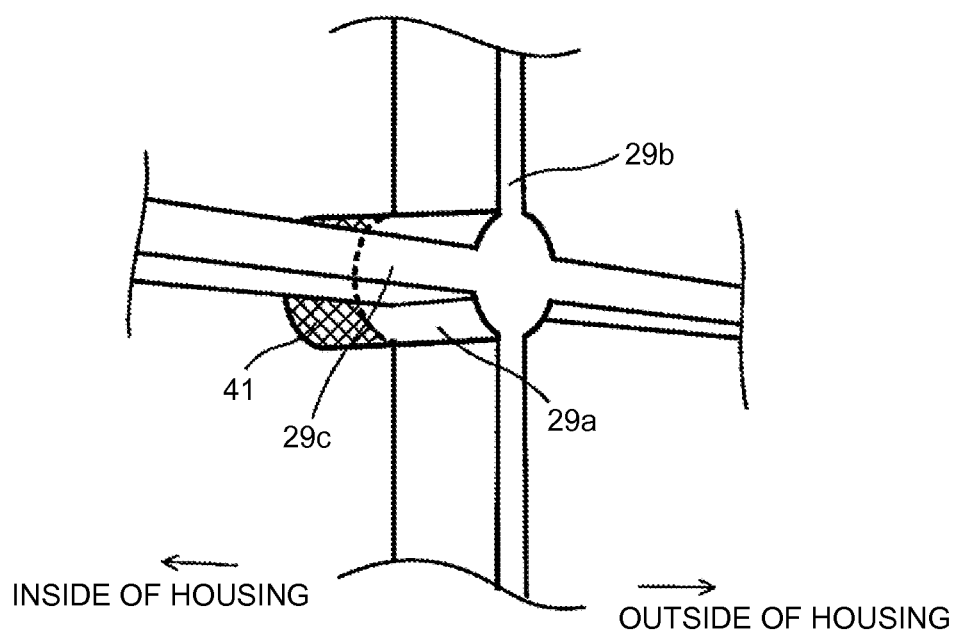
FIG. 15B is a diagram for illustrating the blind effect of the protrusions of the lattice unit according to the first modification.
Figure 16A:
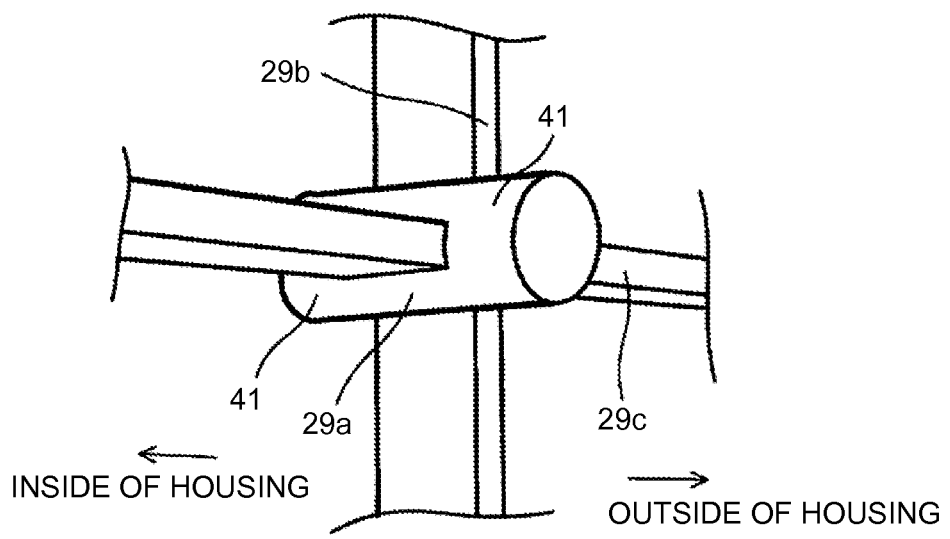
FIG. 16A is a perspective view extracting a part of the lattice unit according to a second modification.
Figure 16B:
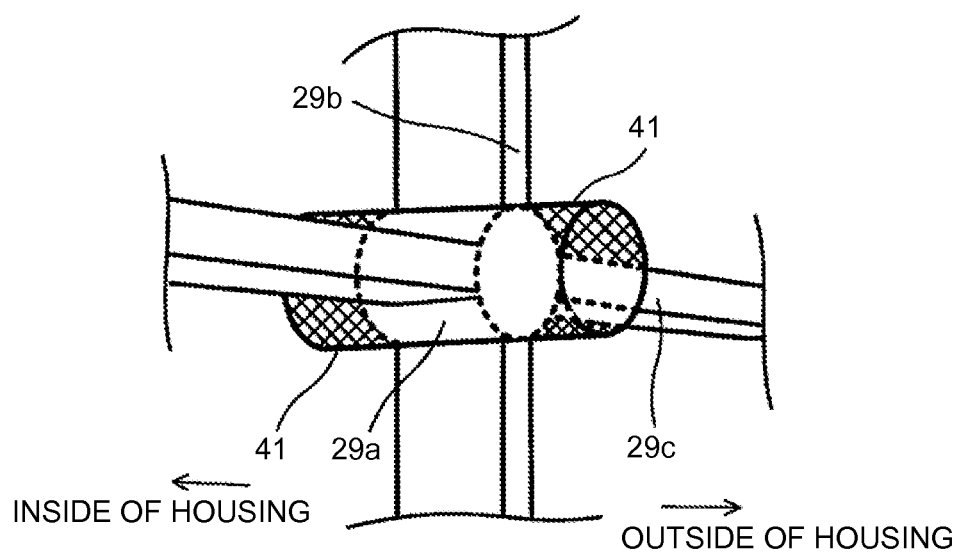
FIG. 16B is a diagram for illustrating the blind effect of the protrusions of the lattice unit according to the second modification.

Although the protruding portion 41 protrudes outward the housing 12 from the intersection in the lattice of the lattice bodies 29 and 43 (the outward protruding portion of the cylindrical part 29a is the cylindrical protrusion 41) in the above embodiment, instead, the protruding portion 41 may be protruded inward the housing 12 from the intersection of the lattice body so that the inward protruding portion of the cylindrical part 29a will be the cylindrical protrusion 41, as illustrated in FIG. 15A, for example. In this case, as illustrated in FIG. 15B, the region corresponding to the hatched parts within the housing 12 will be hidden behind the cylindrical protrusions 41. Further, in this case, the outer surface of the housing 12 in the lattice body may be on the same plane as the outer surface of the frame units 23 and 35, or may be positioned inward the housing 12 than the outer surface. Further, as illustrated in FIG. 16A, the cylindrical part 29a may be protruded both outward and inward the housing 12 from the intersection of the lattice body so that these will be the protruding portions 41. In this case, as illustrated in FIG. 16B, the regions corresponding to the hatched parts within the housing 12 will be hidden behind the cylindrical protrusions 41.

Although the cylindrical protrusion 41 is a part of the cylindrical part 29a in the above embodiment, at least one cylindrical protrusion 41 may be attached to at least one intersection in the lattice of the lattice body (see FIG. 17) without limited to the above.

Although the cylindrical part 29a including the cylindrical protrusion 41 is provided to the intersection in the lattice of the lattice body in the above embodiment, instead, a rectangular parallelepiped prism part 129a including a rectangular parallelepiped prism protrusion 141 may be provided to the intersection in the lattice of a lattice body 129. In this case, one prism protrusion 141 may be protruded outward the housing 12 (see FIG. 18) or may protrude inward the housing 12 though illustration is omitted, or one prism protrusion 141 may be protruded outward the housing 12 and the other may be protruded inward the housing 12.

Further, the length in the X direction of the lattice body (the length along the penetrating direction of the through hole) and the lattice pitch (distance between the axes of adjacent cylindrical parts in the Y axis and the Z axis) are not limited to those described above, but may be modified as needed.

Although the lattice pitch in the lattice body defining (forming) the multiple through holes of the vent hole (the intake port 17 or the exhaust port 19) is even in the above embodiment, at least one lattice pitch in at least one lattice body may be different from other lattice pitch.

Instead of the lattice bodies 29 and 43, the resultant of rotation of the lattice bodies 29 and 43 with respect to the X axis by a particular angle (0 to 90 degrees) may be employed as the part defining (forming) the multiple through holes of the vent hole (the intake port 17 or the exhaust port 19).

Although the part defining (forming) the multiple through holes of the vent hole (the intake port 17 or the exhaust port 19) is formed such that the multiple long, narrow components are orthogonally crossed each other in the above embodiment, the arrangement is not limited to it as long as they are formed crossed each other, in short.

Although the part defining (forming) the multiple through holes of the vent hole (the intake port 17 or the exhaust port 19) is formed such that the multiple long, narrow components extending in one axis direction are orthogonally crossed each other in the above embodiment, they may be formed crossed each other such that multiple curved long, narrow components are crossed each other, for example.

Although the vent hole (the intake port 17 or the exhaust port 19) is arranged with the multiple through holes defined (formed) by the lattice body and the frame unit surrounding the lattice body in the above embodiment, it may be arranged with multiple through holes formed by, for example, gouging out and penetrating the wall of the housing without limited to the above.

Although the intake port 17 is provided in the side wall 48 in +X side of the housing 12 and the exhaust port 19 is provided in the side wall 31 in −X side of the housing 12 in the above embodiment, the arrangement is not limited to it as long as the intake port and the exhaust port are provided in the different portions each other, preferably, provided in the different walls of the housing 12.

Although the cylindrical protrusion 41 is provided to the intersection in the lattice of the lattice body in the above embodiment, in addition to it, they may be provided to other part than the intersection in the lattice of the lattice body.

Figure 19:
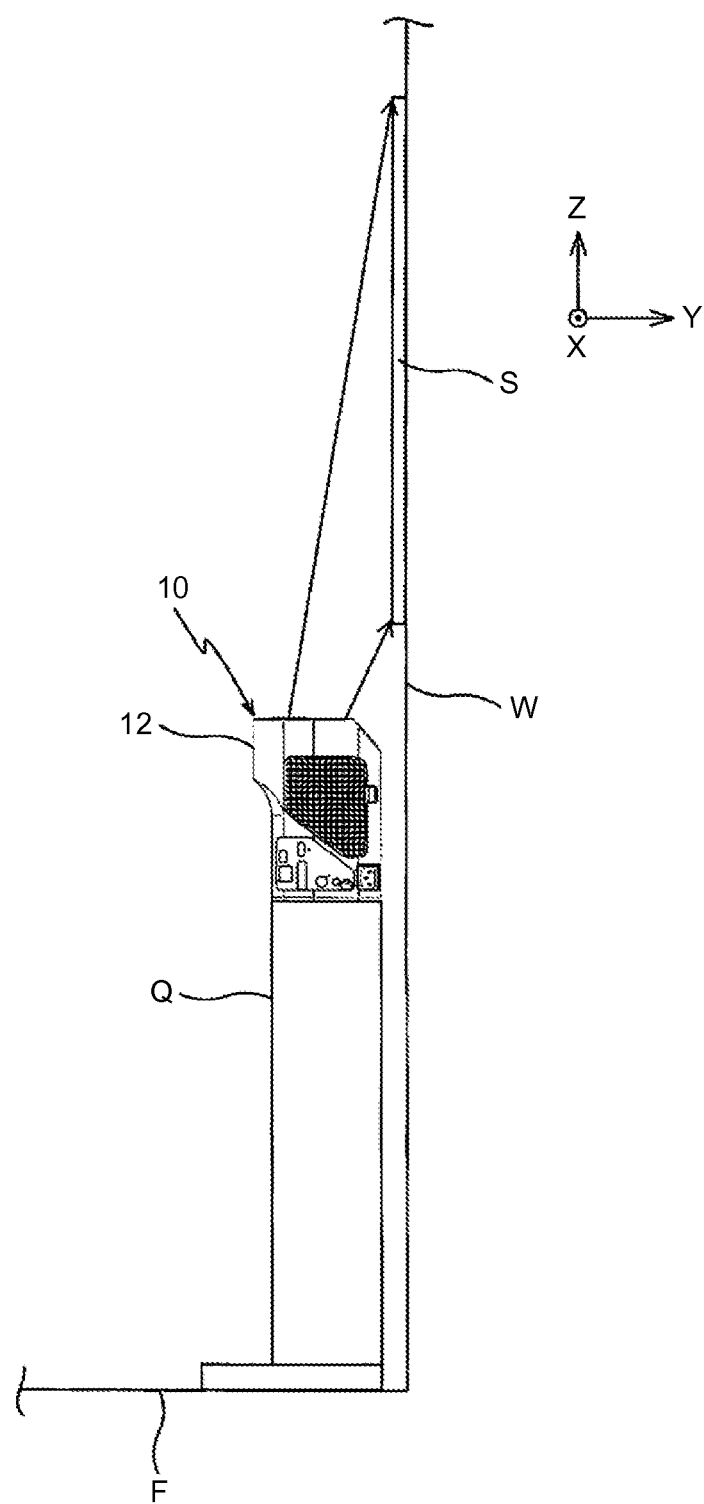
FIG. 19 is an example of a method of using a projector according to a fifth modification.

Although the general-purpose pedestal P is employed as a pedestal on which the projector 10 is set in the above embodiment, instead, a dedicated pedestal Q to be combined to the projector 10 may be employed as illustrated in FIG. 19, for example. If the projector 10 and the pedestal Q are combined to have a projector with stage, when the external force is applied to the side surface of the projector 10, the distance from the supporting point (the lower end of the pedestal Q) to the line of action of the force will be significantly longer and thus the moment of the external force will be larger, so that it is not likely to tilt all the more. As described above, however, the external force in the horizontal direction is hardly applied to the projector 10 when the press button is pressed down and when the lever is revolved, so that the tilting of the projector with stage is prevented.

It is noted that the projector 10 and the pedestal Q may be integrated or may be able to be separated. The height of the pedestal Q is set to an appropriate value (for example, 50 cm to 100 cm) by which the image can be projected from the projector 10 to the screen S. Further, the pedestal Q may be arranged to be adjustable in height and inclination. Specifically, three height-adjustable leg parts (adjusters) may be provided that are not in the same line on the under surface of the pedestal Q, for example.

Although the plurality of operating units are arranged in the −X region of the upper wall 38 of the housing 12 and the light projection opening 40 is arranged in the +X region in the above embodiment, the opposite is possible.

The type (function), the number, the size and the shape of the plurality of operating members in the above embodiment are the example and not limited to those in the above embodiment.

Although the press buttons are applied for the plurality of pressing type operating members in the above embodiment, a pressing type switch having two parts to be pressed corresponding to on/off may be employed, for example, without limited to the above.

Although the focus adjustment lever 34 is provided revolvable with respect to the axis line extending in the Z axis direction in the above embodiment, it is not limited to this and, in short, may be provided revolvable with respect to the axis line (for example, the X axis or the Y axis) extending along the side wall 26 in −Y side of the housing 12.

Although the lever is employed as the member for adjusting the focal point position of the projection lens 96 in the above embodiment, an adjustment dial (knob) may be employed that is rotatable with respect to the axis line extending the direction (for example, the X axis or the Z axis direction) parallel to or the direction (for example, the Y axis direction) intersecting with the side wall 26 in −Y side of the housing 12. In this case, in the adjustment dial, at least a part thereof may be inserted in the window similarly to the knob 34a of the focus adjustment lever 34.

The type, the number, the position, and so on of the connectors in the above embodiment are one of the examples and thus not limited to them.

Although the plurality of connectors of the connector unit 8 are provided on the side wall 48 in +X side of the housing 12 in the above embodiment, instead, they may be provided on the side wall 31 in −X side of the housing 12. In this case, it is preferable that the plurality of connectors are arranged under the exhaust port 19. This prevents the exhaust port 19 from being blocked by the cables connected to the plurality of connectors, that is, prevents the exhaustion of the exhaust port 19 from being blocked. In other words, this prevents the heated air exhausted through the exhaust port 19 from blowing against the cables.

Although the intake port 17 is formed in the side wall 48 in +X side of the housing 12 and the exhaust port 19 is formed in the side wall 31 in −X side of the housing 12 in the above embodiment, the arrangement is not limited to it and the intake port 17 or the exhaust port 19 may be formed in the side wall in −Y side or +Y side of the housing 12, or one of the intake port 17 or the exhaust port 19 is formed in the side wall 26 in −Y side of the housing 12 and the other is formed in the side wall 42 in +Y side of the housing 12. In this case, it is preferable that the plurality of connectors are arranged in the part under the intake port or the exhaust port in the side wall in which the intake port or the exhaust port is provided.

Although the number of the connectors arranged in the region under the intake part 17 in the side wall 48 in +X side of the housing 12 is seven in the above embodiment, the number is not limited to it and, for example, may be less than seven or may be greater than seven.

Although plural (seven) connectors are arranged in two lateral rows in the above embodiment, the arrangement is not limited to it and may be arranged in one row or may be arranged in more than two lateral rows.

Although the USB memory M, the personal computer C, and the DVD video recorder R are used as the external devices connected to the projector 10 in the above embodiment, in addition to them or in place of them, other USB memory, other personal computer, other DVD video recorder, a liquid crystal monitor, an audio amplifier, a DVD player, a video deck, and so on may be used, for example.

Although no cable is connected to the LAN terminal 56 and the video input terminal 60 in the above embodiment, the other end (the other terminal) of a network cable, one end (one terminal) of which is connected to a server, may be connected to the LAN terminal 56, and the other end (the other terminal) of a video cable, one end (one terminal) of which is connected to an AV device, may be connected to the video input terminal 60.

Although the housing 12 includes the member of substantially the rectangular parallelepiped in the above embodiment, the shape is not limited to it as long as it includes a box-shaped hollow member.

Although the projector 10 is used in the meeting room in the above embodiment, the use is not limited to it. That is, the projector 10 is compact and therefore excellent in portability as described above, and thus it is not necessary to be fixed within a particular meeting room and is expected to be freely carried and used in various places.

It is noted that the housing 12 may be fixed upside down to a support extended from a ceiling or a wall, for example. Specifically, the housing 12 provided with a sensor for determining an orientation of the top and bottom is set upside down and each leg member 46 of the bottom wall 24 is fixed to the ceiling or the support through a fixing part. In this case, the orientation of the top and bottom is determined by the sensor, and the light according to the image information is projected in oblique, downward from the light projection opening 40.

Although the projector is used for the meeting held by plural members in the above embodiment, the usage is not limited to it and it may be used for presentation, for example.

Although the embodiments as described above are applied to the vertical stand type projector in the above embodiment, it may be applicable to so called horizontal stand type projector.

Although the projector that can output image and sound has been described as an example of projector in the above embodiment, the projector is not limited to it and may be a projector that can output image only, for example.

Although the projector 10 is applied as the electronic device in the above embodiment, the device is not limited to it and may be any electronic devices in which a heat generating part is accommodated and which includes a housing having a vent hole, such as a personal computer, a copying machine, a printer, and so on.

According to the embodiments, it is possible to reduce the pressure loss of the airflow while obtaining the blind effect.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
a housing; and
a vent unit provided to the housing, the vent unit having a two-dimensional lattice unit and a column part, the two-dimensional lattice unit including one-dimensional lattice parts intersecting each other, the column part being provided at each of an intersection of the one-dimensional lattice parts and protruding to at least one of the inside and the outside of the two-dimensional lattice unit,
wherein the column part is cylindrical, and a diameter of the cylindrical column part is set to one-third to two-thirds of a lattice pitch of the two-dimensional lattice unit.

2. The electronic device according to claim 1, further comprising a blower unit provided inside the housing,
wherein the vent unit includes an intake vent unit and an exhaust vent unit provided at different positions of the housing, the intake vent unit provides a vent path for taking air into the housing by the blower unit, and the exhaust vent unit provides a vent path for exhausting the air through a heat generating unit to the outside of the housing.

3. The electronic device according to claim 1, wherein the column part includes a portion covering four corner portions that are formed by the intersection and the corresponding two one-dimensional lattice parts.

4. The electronic device according to claim 1, wherein the column part protrudes to the outside of the two-dimensional lattice unit so that a tip of a protruding portion of the column part is positioned on the same plane or inside a peripheral part of the vent unit of the housing.

5. The electronic device according to claim 1, wherein
the housing includes substantially a box-shaped hollow member,
the electronic device further comprises an image projection unit configured to project a light based on image information obliquely upward from a rear wall of the housing through a light projection opening provided in an upper wall of the housing, and
the vent unit includes vent units that are provided in walls of the housing facing each other, respectively, except the upper wall and a bottom wall of the housing.

6. The electronic device according to claim 5, wherein the image projection unit includes an optical system having a short focal point for projecting the light in a short distance through the light projection opening.

7. The electronic device according to claim 1, wherein a diameter of the cylindrical column part is greater than a thickness of the one-dimensional lattice parts.

8. The electronic device according to claim 1, wherein a height of the cylindrical column part is set to one-third to two-thirds of a thickness of the two-dimensional lattice unit.

9. The electronic device according to claim 1, wherein the column part has a cross section whose diameter is larger than a square at an intersection of the one-dimensional lattice parts.

* * * * *